US 8,241,159 B2

(12) United States Patent
Iwata

(10) Patent No.: US 8,241,159 B2
(45) Date of Patent: Aug. 14, 2012

(54) METHOD AND APPARATUS FOR MOUNTING AND DISMOUNTING BELTS TO AND FROM PULLEYS

(75) Inventor: Hidetsugu Iwata, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1214 days.

(21) Appl. No.: 11/965,823

(22) Filed: Dec. 28, 2007

(65) Prior Publication Data

US 2008/0155803 A1    Jul. 3, 2008

(30) Foreign Application Priority Data

Dec. 28, 2006    (JP) .................................. 2006-354054

(51) Int. Cl.
  *B25B 27/14*    (2006.01)
  *F16H 7/24*    (2006.01)
(52) U.S. Cl. ....................................................... 474/130
(58) Field of Classification Search ................... 474/130
  See application file for complete search history.

(56) References Cited

U.S. PATENT DOCUMENTS

| 551,486 A | * | 12/1895 | Brion, Jr. ...................... 474/130 |
| 6,033,331 A | * | 3/2000 | Winninger et al. ........... 474/260 |
| 6,402,649 B1 | * | 6/2002 | Amkreutz ...................... 474/130 |
| 6,565,467 B2 | * | 5/2003 | Amkreutz ...................... 474/130 |
| 6,692,391 B2 | * | 2/2004 | Gerring et al. ................ 474/130 |
| 7,048,663 B2 | * | 5/2006 | Riaudel ......................... 474/130 |
| 7,211,015 B2 | * | 5/2007 | Shaw ............................ 474/130 |
| 7,247,110 B2 | * | 7/2007 | Winninger et al. ........... 474/130 |
| 7,335,121 B2 | * | 2/2008 | Fletcher et al. ............... 474/130 |
| 2003/0176248 A1 | * | 9/2003 | De Meester et al. .......... 474/130 |
| 2004/0002400 A1 | * | 1/2004 | Ellis et al. .................... 474/130 |
| 2008/0155803 A1 | * | 7/2008 | Iwata ........................... 29/281.4 |

* cited by examiner

*Primary Examiner* — Michael Mansen
*Assistant Examiner* — Mark K Buse
(74) *Attorney, Agent, or Firm* — Dickstein Shapiro LLP

(57) ABSTRACT

A method for mounting a belt on a first pulley and a second pulley is disclosed, wherein a guide member and a fixing member is used. The method includes steps of winding the belt around a pulley groove of the second pulley; fitting the guide member in an inner groove of the first pulley; fixing the guide member on the first pulley using the fixing member; seating the belt in the inner pulley groove of the first pulley using the fixing member; positioning the belt in the outer direction with respect to the axial direction of the first pulley, by the guidance of a belt introduction surface of the guide member; and rotating the first pulley in the rotational direction of the first pulley so as to seat the belt in the inner pulley groove of the first pulley.

14 Claims, 14 Drawing Sheets

Prior Art

METHOD AND APPARATUS FOR MOUNTING AND DISMOUNTING BELTS TO AND FROM PULLEYS

CROSS REFERENCE TO RELATED APPLICATIONS AND INCORPORATION BY REFERENCE

This application is based upon and claims the benefit of priority from the prior Japanese Patent Application No. 2006-354054, filed on Dec. 28, 2006; the entire content of which is incorporated herein by reference.

BACKGROUND OF THE INVENTION

1. Field of the Invention

The present invention relates to a method for mounting a belt which can expand and contract on a pair of pulleys, an apparatus for mounting the belt on the pulleys, a method for mounting and dismounting the belt to and from the pulleys, and an apparatus for mounting and dismounting the belt to and from the pulleys.

2. Discussion of the Related Art

In a belt driving unit, a V-ribbed belt is wound around a pulley (driving pulley) having a pulley groove on an outer periphery thereof. On this type of belt driving mechanism, a tension adjusting member such as a tension pulley is generally provided. After the V-ribbed belt is mounted on the driving pulley, the tension adjusting member is properly set for imparting a predetermined tension to the belt.

On the other hand, there is another belt driving mechanism without a tension adjusting member. Such belt driving mechanism was designed for simplifying the structure and decreasing the cost. For this mechanism, a V-ribbed belt which expands and contracts in the lengthwise direction of the belt (stretchable V-ribbed belt) is used. The belt is positioned on the pulleys by the installation across the flange of the pulley. The belt includes a flat main body in the form of a ring, wherein core wires made of fabrics having good stretching properties are embedded. The main body has an inner periphery having a plurality of V-ribs which are integral with each other. The V-ribs stretch in the peripheral direction of the belt main body.

On the other hand, the pulley has a pulley groove including a plurality of pulley V-grooves extending in a peripheral direction of the pulley. The plurality of V-ribs is configured to fit into the pulley V-grooves prepared on the pulley.

When the V-ribbed belt is seated on the pulley, it is necessary to stretch the belt in a peripheral direction of the belt. The stretched belt is seated in the pulley groove from the outer side of the flange, with respect to the axial direction of the pulley. For this operation, a large tensile strength generates, that requires the use of an apparatus for mounting a belt on a pulley.

FIG. 25 is a diagram for showing an apparatus for mounting a striated belt on a pulley disclosed in U.S. Pat. No. 6,033,331. A belt mounting apparatus 101 includes a conical member 103 provided with a smooth guiding surface 104, a guiding element 105, a leg 106, a top part 102 and a lever 107. The leg 106 of the apparatus 101 has an inner periphery which is slidable on a pulley flange 111 provided on the pulley 110. An end of the lever 107 engages with the top part 102.

The leg 106 and the conical member 103 of the apparatus 101 are brought into contact with the outer periphery of the pulley flange 111. Further, a ribbed belt 120 is seated on the pulley groove 113 at a rear part of the apparatus 101 with respect to the rotational direction thereof, as shown by the arrow in FIG. 25. Then, the ribbed belt 120 is positioned so as to extend with contacting the conical member 103, smooth guiding surface 104, and guiding element 105. The conical member 103 has functions (i) to prevent the thus provided ribbed belt 120 from being detached from the pulley groove 113, and (ii) to have the extending direction of the ribbed belt 120 changed from the outer side of the pulley to a direction along the pulley groove 111.

When the V-ribbed belt 120 is set as described above, the lever 107 is operated so that the leg 106 is pressed against the outer periphery of the pulley flange 111. By this operation, the belt installation apparatus 101 rotates in the direction of periphery of the pulley 110. Accordingly, a rear part of the V-ribbed belt 120 with respect to the rotational direction of the apparatus 101 is gradually seated in the pulley groove 113. Consequently, the V-ribbed belt 110 is completely mounted on the pulley 110.

It is possible, however, the apparatus 101 disclosed in U.S. Pat. No. 6,033,331 gives a damage on the pulley 110 when the leg 106 are brought into pressure contact with and slides on the pulley flange 111.

Moreover, there is a difficulty to use the apparatus 101 disclosed in the U.S. Pat. No. 6,033,331 for mounting a V-ribbed belt on a pulley having an outer pulley groove and an inner pulley groove in parallel on the outer periphery of the pulley. More precisely, the belt is positioned in the inner pulley groove by passing over the outer pulley. In this case, the V-ribbed belt 120 is stretched with a large deformation of the belt 120 by the guidance of the guiding surface 104. Namely, the belt 120 is brought into a pressure contact with the smooth guiding surface 104 and the leg 106. Accordingly, the V-ribbed belt 120 and the pulley could be damaged during the mounting operation.

On the other hand, it is possible that the V-ribbed belt is provisionally positioned on the outer pulley groove, and then to be moved to the inner pulley groove. In this case, the belt once placed on the outer pulley groove has to be held by a hand for the relocation. For this purpose, the V-ribbed belt on the outer pulley groove is stretched in the axial direction of the pulley, with the ribbed belt being twisted. At the same time, the pulley is rotated so that the pulley is transferred to the inner pulley groove. During this operation, the belt is forced to move across the plurality of grooves on the outer pulley groove, a pulley flange formed between the outer pulley groove and the inner pulley groove, and the plurality of grooves formed in the inner pulley groove. Therefore, the ribbed belt and the pulley would be damaged by being scratched. Further, there is such a possibility that an operator pinches his finger between the pulley and the V-ribbed belt. Moreover, this operation requires to rotate the pulley 2 or 3 times for assembly, that would be resulting in a low operational efficiency.

SUMMARY OF THE INVENTION

It is therefore an object of the present invention to provide a method for mounting a belt on a first pulley and a second pulley, wherein the belt and the pulleys are prevented from damages, and the operation can be safely carried out, with an excellent efficiency.

The above object of the present invention is attained by a method for mounting a belt on a first pulley and a second pulley, the first pulley successively having an outer pulley flange, a middle pulley flange, and an inner pulley flange; an outer pulley groove provided between the outer pulley flange and the middle pulley flange, and an inner pulley groove provided between the middle pulley flange and the inner pulley flange, and the second pulley having a pulley groove, the belt having a ring-shape and configured to be stretched in a peripheral direction, the belt being mounted on the first pulley groove by being positioned thereon from the outer side of the outer flange, with respect to the axial direction of the first pulley, comprising:

using a guide member and a fixing member to install the belt in the inner pulley groove, wherein the guide member comprises an attaching element and a belt guiding element, the attaching element extending in the peripheral direction of the first pulley, the attaching element having an inner surface configured for being seated in the outer pulley groove of the first pulley and for covering the outer peripheries of the outer pulley flange and the middle pulley flange, the belt guiding element provided approximately at the center of the attaching element with respect to the longitudinal direction thereof and protruding from the attaching element, the guide member having a belt introduction surface configured to face the rotational direction of the first pulley when the guide member is installed on the first pulley, the fixing member configure to fix the guide member on the first pulley and to hold the belt so that the belt is seated in the inner pulley groove of the first pulley;

winding the belt around the pulley groove of the second pulley;

fitting the guide member in the inner groove of the first pulley;

fixing the guide member on the first pulley using the fixing member;

seating the belt in the inner pulley groove of the first pulley using the fixing member;

positioning the belt in the outer direction with respect to the axial direction of the first pulley, by the guidance of the belt introduction surface of the guide member; and rotating the first pulley in the rotational direction of the first pulley so as to seat the belt in the inner pulley groove of the first pulley.

It is another object of the present invention to provide a method for mounting a belt on a first pulley and a second pulley, wherein the belt and the pulleys are prevented from damages, and the operation can be safely carried out, with an excellent efficiency.

The above object is achieved by an apparatus for mounting a belt on a first pulley and a second pulley, the first pulley successively having an outer pulley flange, a middle pulley flange, and an inner pulley flange; an outer pulley groove provided between the outer pulley flange and the middle pulley flange, and an inner pulley groove provided between the middle pulley flange and the inner pulley flange, and the second pulley having a pulley groove, the belt having a ring-shape and configured to be stretched in a peripheral direction, the belt being mounted on the first pulley groove by being positioned thereon from the outer side of the outer flange, with respect to the axial direction of the first pulley, comprising:

a guide member comprising an attaching element and a guide member, the attaching element extending in the peripheral direction of the first pulley, the attaching element having an inner surface configured for being seated in the outer pulley groove of the first pulley and for covering the outer peripheries of the outer pulley flange and the middle pulley flange, the belt guiding element provided approximately at the center of the attaching element with respect to the longitudinal direction thereof and protruding from the attaching element, the guide member having a belt introduction surface configured to face the rotational direction of the first pulley when the guide member is installed on the first pulley, and a fixing member configured to fix the guide member on the first pulley and to hold the belt so that the belt is seated in the inner pulley groove of the first pulley.

It is preferable that the apparatus for mounting a belt further comprises a belt regulating member for preventing the belt seated in the pulley groove of the second pulley from deviating to an outer side of the second pulley with respect to an axial direction thereof.

The belt regulating member effectively prevent the belt from being detached from the second pulley when the belt is seated in the pulley groove on the second pulley, that is performed in the beginning of the method for mounting the belt.

Furthermore, it is also preferable that the guide member included in the apparatus of the invention comprises an engaging element in the form of a channel configured to extend in an axial direction of the first pulley, the engaging element provided on the outer side of the attaching element so as to be located at a rear part thereof with respect to the rotational direction of the first pulley, the fixing member comprising a securer, a belt retainer, and a connection connecting the securer and the belt retainer, the securer configured to be inserted into a service hole perforated in the first pulley from the outer side thereof with respect to the axial direction of the first pulley, the belt retainer configured to extend across the guide member to have a free end of the belt retainer exceeded an inner lateral side, with respect to the axial direction of the first pulley, of the guide member so that the belt retainer is seated in the engaging element, the free end of the engaging element holding the belt so that the belt is seated the inner pulley groove of the first pulley.

It is a further object of the invention to provide a method for mounting and dismounting a belt to and from a first pulley and a second pulley, wherein the belt and the pulleys are prevented from damages, and the operation can be safely carried out, with an excellent efficiency.

The above object of the present invention is achieved by a method for mounting and dismounting a belt on a first pulley and a second pulley, each of the first pulley and the second pulley successively having an outer pulley flange, a middle pulley flange, and an inner pulley flange; an outer pulley groove provided between the outer pulley flange and the middle pulley flange, and an inner pulley groove provided between the middle pulley flange and the inner pulley flange, the belt having a ring-shape and configured to be stretched in a peripheral direction, the belt being mounted and dismounted to and from the inner pulley grooves of the first pulley and the second pulley by being positioned thereon from the outer side of the outer flanges, with respect to the axial direction of the first pulley and the second pulley, comprising:

using a guide member and a fixing member to mount and dismount the belt to and from the first and the second pulleys, wherein the guide member comprises an attaching element, a belt guiding element and a belt deviation element, the attaching element extending in the peripheral direction of the first pulley and the second pulley, the attaching element having an inner surface configured for being seated in the outer pulley groove of the first pulley and the inner pulley groove of the second pulley and for covering the outer peripheries of the middle pulley flange and the outer pulley flange of the first pulley and the outer peripheries of the inner pulley flange and the middle pulley flange of the second pulley; the belt guiding element provided approximately at the center of the attaching element with respect to the longitudinal direction thereof and protruding from the attaching element, the belt guiding element having a belt introduction surface configured to face the rotational direction of the first pulley and the second pulley; the belt deviation element configured to extend in an outer direction with respect to the axial direction of the second pulley so as to cover the outer pulley groove and the outer periphery of the outer pulley flange of the second pulley, the fixing member configure to fix the guide member on the first pulley and to hold the belt so that the belt is seated in the inner pulley groove of the first pulley;

winding the belt around the pulley groove of the second pulley;

fitting the guide member in the inner groove of the first pulley;

fixing the guide member on the first pulley using the fixing member;

seating the belt in the inner pulley groove of the first pulley using the fixing member;

positioning the belt in the outer direction with respect to the axial direction of the first pulley, by the guidance of the belt introduction surface of the guide member;

rotating the first pulley in the rotational direction of the first pulley so as to seat the belt in the inner pulley groove of the first pulley, whereby the belt is mounted on the first pulley and the second pulley;

fitting the guide member in the inner groove of the second pulley; and rotating the first pulley in the rotational direction of the first pulley, whereby the belt is dismounted from the first pulley and the second pulley.

to provide a method for mounting a belt on a first pulley and a second pulley, wherein the belt and the pulleys are prevented from damages, and the operation can be safely carried out, with an excellent efficiency.

It is still another object of the present invention to provide method for mounting and dismounting a belt to and from a first pulley and a second pulley, wherein the belt and the pulleys are prevented from damages, and the operation can be safely carried out, with an excellent efficiency.

The above object of the invention is achieved by an apparatus for mounting and dismounting a belt to and from a first pulley and a second pulley, each of the first pulley and the second pulley successively having an outer pulley flange, a middle pulley flange, and an inner pulley flange; an outer pulley groove provided between the outer pulley flange and the middle pulley flange, and an inner pulley groove provided between the middle pulley flange and the inner pulley flange, the belt having a ring-shape and configured to be stretched in a peripheral direction, the belt being mounted and dismounted to and from the inner pulley grooves of the first pulley and the second pulley by being positioned thereon from the outer side of the outer flanges, with respect to the axial direction of the first pulley and the second pulley, comprising:

a guide member comprising an attaching element, a belt guiding element and a belt deviation element, the attaching element extending in the peripheral direction of the first pulley and the second pulley, the attaching element having an inner surface configured for being seated in the outer pulley groove of the first pulley and the inner pulley groove of the second pulley and for covering the outer peripheries of the middle pulley flange and the outer pulley flange of the first pulley and the outer peripheries of the inner pulley flange and the middle pulley flange of the second pulley; the belt guiding element provided approximately at the center of the attaching element with respect to the longitudinal direction thereof and protruding from the attaching element, the belt guiding element having a belt introduction surface configured to face the rotational direction of the first pulley and the second pulley; the belt deviation element configured to extend in an outer direction with respect to the axial direction of the second pulley so as to cover the outer pulley groove and the outer periphery of the outer pulley flange of the second pulley, and a fixing member configured to fix the guide member on the first pulley and to hold the belt so that the belt is seated in the inner pulley groove of the first pulley.

It is preferable that the apparatus for mounting and dismounting a belt further comprises a belt regulating member for preventing the belt seated in the pulley groove of the second pulley from deviating to an outer side of the second pulley with respect to an axial direction thereof.

The belt regulating member effectively prevent the belt from being detached from the second pulley when the belt is seated in the pulley groove on the second pulley, that is performed in the beginning of the method for mounting the belt.

Furthermore, it is also preferable that the guide member included in the apparatus for mounting and dismounting a belt comprises an engaging element in the form of a channel configured to extend in an axial direction of the first pulley, the engaging element being provided on the outer side of the attaching element between the belt guiding element and the belt deviation element, the fixing member comprising a securer, and a belt retainer, and a connection connecting the securer and the belt retainer, the securer being configured to be inserted into a service hole perforated in the first pulley from the outer side of the first pulley with respect to the axial direction thereof, the belt retainer configured to extend across the guide member to have a free end of the belt retainer exceeded an inner lateral side, with respect to the axial direction of the first pulley, of the guide member so that the belt retainer is seated in the engaging element, the free end of the engaging element holding the belt so that the belt is seated the inner pulley groove of the first pulley.

BRIEF DESCRIPTION OF THE DRAWINGS

A more complete appreciation of the invention and many of the attendant advantages thereof will be readily perceived as the same becomes better understood by reference to the following detailed description when considered in connection with the accompanying drawings, wherein.

DETAILED DESCRIPTION OF THE INVENTION

Other features of this invention will become apparent in the course of the following description of exemplary embodiments, which are given for illustration of the invention and are not intended to be limiting thereof.

A method for mounting a belt, an apparatus for mounting the belt, a method for mounting and dismounting the belt, and an apparatus for mounting and dismounting the belt, with respect to a pair of pulleys will now be explained in detail.

First Embodiment

As a first embodiment, a method for mounting a V-ribbed belt which expands and contracts on pulleys (belt mounting method) and an apparatus for mounting the belt (a belt mounting apparatus) are explained. In this embodiment, the V-ribbed belt in the form of a ring is seated in pulley grooves provided on a crank pulley and an air-conditioner pulley of an engine.

Figure 1:
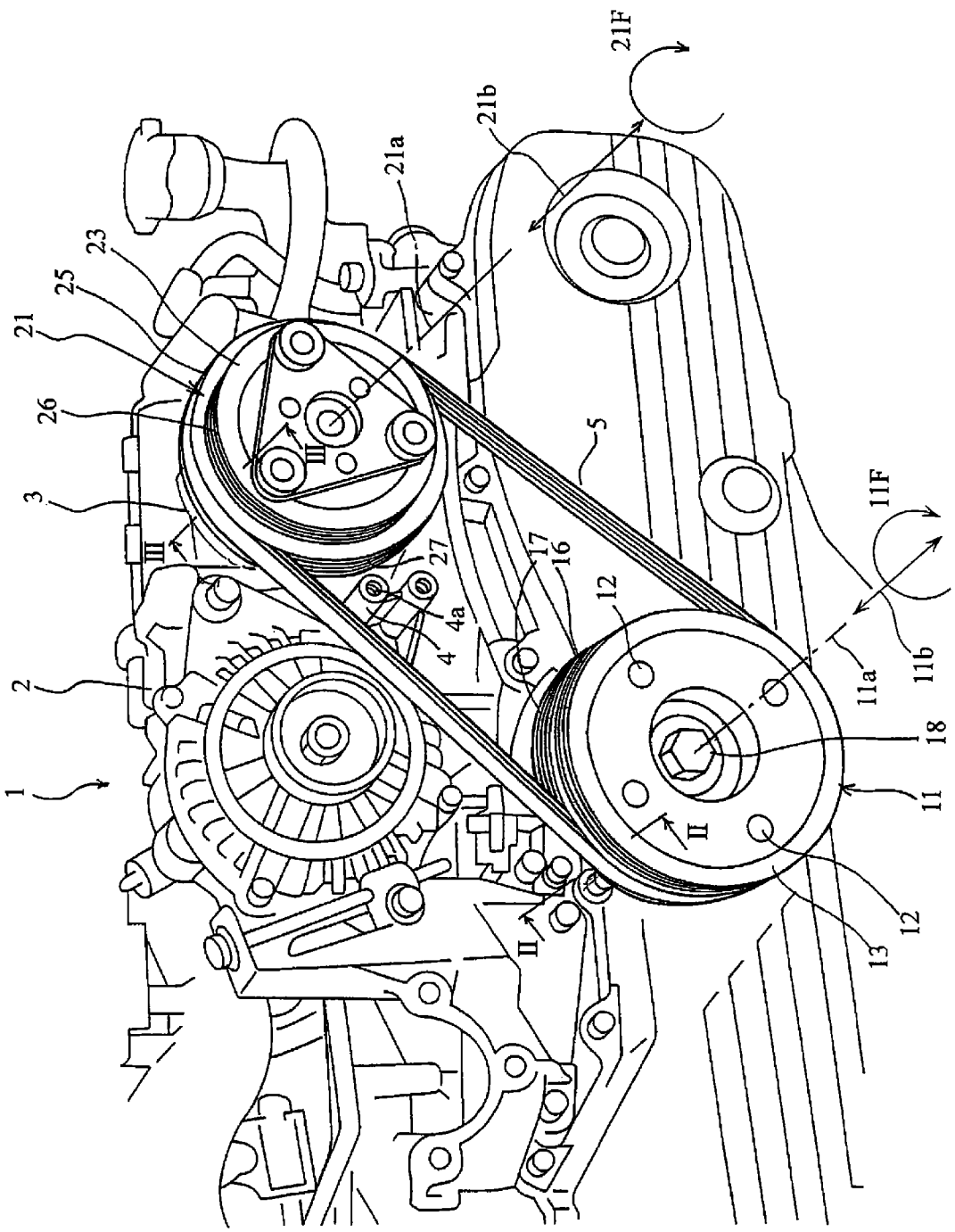
FIG. 1 is a perspective view of an engine.

FIG. 1 is a perspective view of an engine 1. A crank pulley 11 (first pulley) is fastened by a crank pulley bolt 18 on an end of a crank shaft which protruded from an engine main body 2. On the other hand, an air-conditioner pulley 21 (second pulley) is provided on an air-conditioner compressor 3 included in the engine main body 2. A bracket 4 (boss), which has a screw thread, is protruded from the engine main body 2 at a location nearby the air-conditioner pulley 21. A V-ribbed belt 5 is to be wound around the crank pulley 11 and the air-conditioner pulley 21. Dotted lines 11a and 21a in the figure respectively show axial directions of the crank pulley 11 and the air-conditioner pulley 21. Moreover, the arrows 11F and 21F respectively show rotational directions of the crank pulley 11 and the air-conditioner pulley 21.

Figure 2:
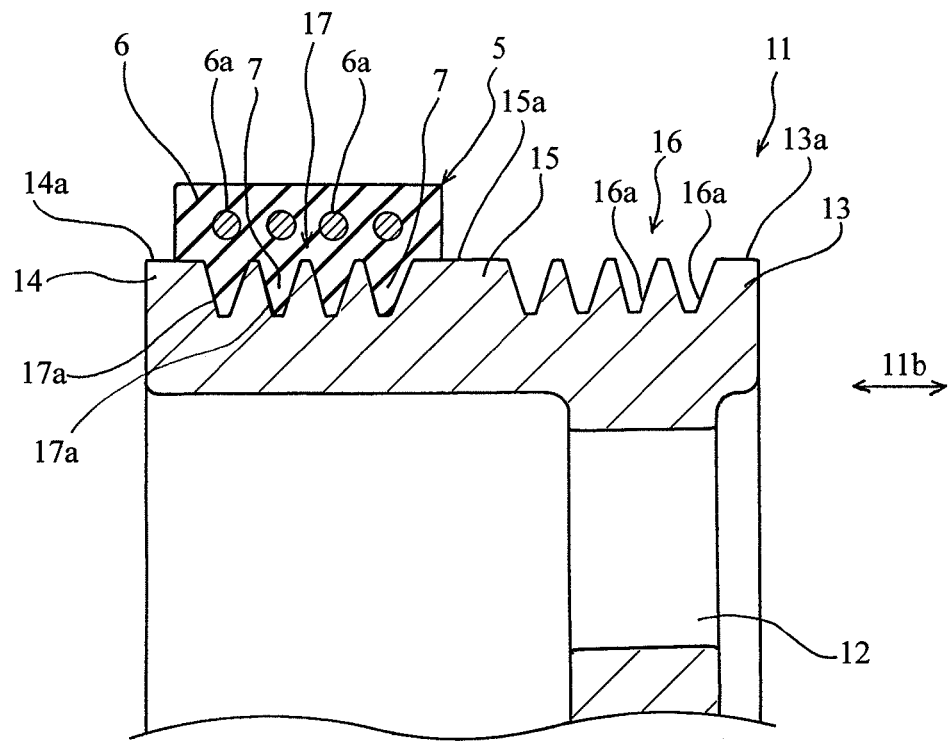
FIG. 2 is a cross-section of a crank pulley included in the engine shown in FIG. 1, which is obtained by cutting the crank pulley along line II-II therein.

FIG. 2 is a cross-section of the crank pulley 11 obtained by cutting the crank pulley shown in FIG. 1 along line II-II therein. As shown in FIGS. 1 and 2, a plurality of service holes 12 is positioned along the periphery of the crank pulley 11. Each of the service holes 12 penetrates the crank pulley 11 and extends in the axial direction thereof. Namely, the service holes 12 extend from the outer surface to the inner surface or the crank pulley 11. On the outer periphery of the crank pulley 11, an outer pulley flange 13 and an inner pulley flange 14 are arranged so as to extend in parallel with each other, on an outer side and an inner side of the pulley 11, with respect to the axial direction thereof. Further, a middle pulley flange 15 is also provided on the outer periphery of the crank pulley 11 at a location between the outer and inner pulley flanges 13 and 14. The outer pulley flange 13, inner pulley flange 14 and middle pulley flange 15 have an identical diameter. An outer pulley groove 16 is provided between the outer pulley flange 13 and the middle pulley flange 15, and an inner pulley groove 17 is provided between the inner pulley flange 14 and the middle pulley flange 15.

At the bottom of the outer pulley groove 16, a plurality of V-grooves 16a (4 V-grooves in FIG. 2) extend in a peripheral direction of the crank pulley 11 in parallel with each other. Furthermore, a plurality of V-grooves 17b (4 V-grooves in FIG. 2) extend in a peripheral direction of the crank pulley 11 in parallel with each other at the bottom of the inner pulley groove 17.

Figure 3:
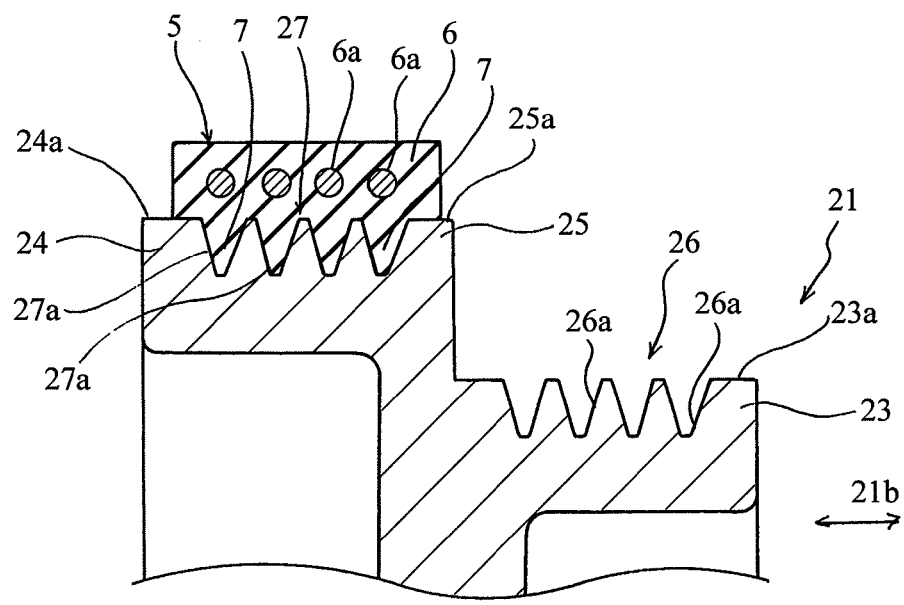
FIG. 3 is a cross-section of an air-conditioner pulley included in the engine shown in FIG. 1, which is obtained by cutting the air-conditioner pulley 21 along line III-IIII therein.

FIG. 3 is a cross-section of the air-conditioner pulley 21 obtained by cutting the pulley 21 shown in FIG. 1 along line III-IIII therein. On the outer periphery of the air-conditioner pulley 21, an outer pulley flange 23 and an inner pulley flange 24 are provided on the outer and inner sides of the pulley 11, respectively, with respect to the axial direction thereof. Further, a middle pulley flange 25 is also provided on the outer periphery of the air-conditioner pulley 21 so as to be located between the outer and the inner pulley flanges 23 and 24. The inner pulley flange 24 and the middle pulley flange 25 have an identical diameter, and the outer pulley flange 23 has a diameter smaller than those of the inner and the middle pulley flanges 24 and 25. An outer pulley groove 26, which extends along the periphery of the air-conditioner pulley 21, is provided between the outer pulley flange 23 and the middle pulley flange 25. Moreover, an inner pulley groove 27 is provided between the inner pulley flange 24 and the middle pulley flange 25. The diameter of inner pulley groove 27 of the pulley 21 is larger than that of the outer pulley groove 26. At the bottom of the outer pulley groove 26, a plurality of V-grooves 26a (4 V-grooves in FIG. 3) extends in a peripheral direction of the air-conditioner pulley 21, so as to be parallel with each other. Furthermore, a plurality of V-grooves 27b (4 V-grooves in FIG. 3) are formed on the bottom of the inner pulley groove 27, and extends in a peripheral direction of the air-conditioner pulley 21. V-grooves 27b are provided so as to be parallel with each other.

The V-ribbed belt 5 is wound around the inner pulley groove 17 of the crank pulley 11 and the inner pulley groove 27 of the air-conditioner pulley 21, as shown in FIGS. 1 to 3. The V-ribbed belt 5 has a belt main body 6 in a ring shape with flat surfaces. The belt 5 has a plurality of core wires 6a embedded in the main body 6. The core wires 6a are made of a fibrous material with an excellent elasticity, such as polyamide. The belt 5 is wound around the inner pulley grooves 17 and 27 so that a plurality of V-ribs 7 (4 ribs in this embodiment) formed on the inner periphery of the main body 6 are fit into the V-grooves 17a and 27a respectively formed in the inner pulley grooves 17 and 27 of the crank pulley 11 and the air-conditioner pulley 21. The V-ribbed belt 5 is mounted on the pulleys 11 and 21 so as to be seated in the inner pulley grooves 17 and 27. For the mounting operation, the belt is brought into the inner pulley grooves 17 and 27 from the outer side of the outer pulley flanges 13 and 23, that has an open space for the operation.

Figure 7:
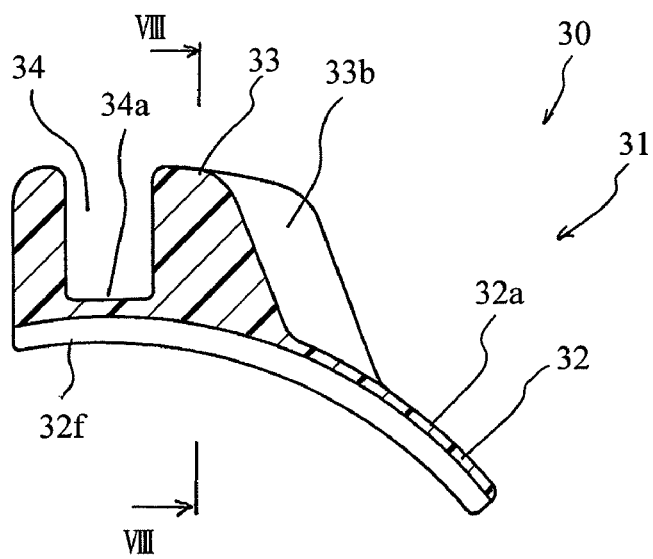
FIG. 7 is a cross-section of the guide member shown in FIG. 5, which is obtained by cutting the guide member along line VII-VII therein.
Figure 8:
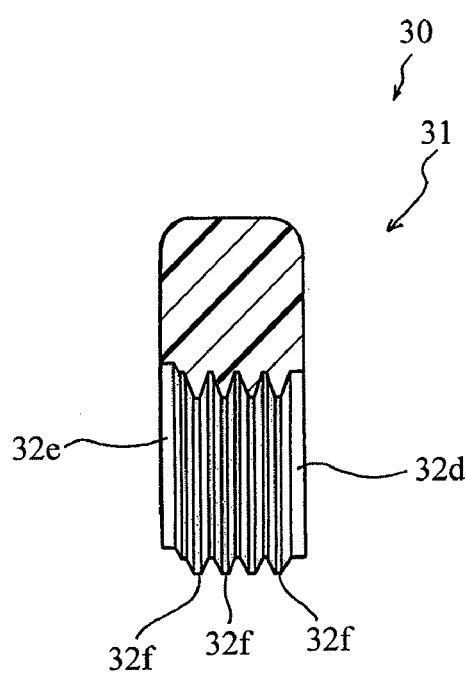
FIG. 8 is a cross-section of the guide member shown in FIG. 7, which is obtained by cutting the guide member along line VIII-VIII therein.
Figure 9:
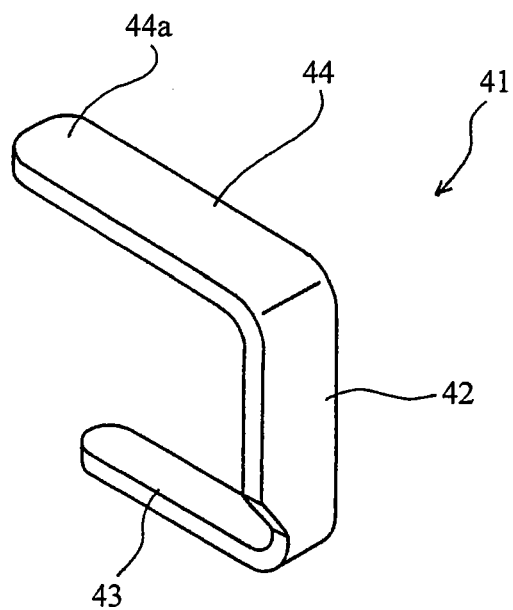
FIG. 9 is a perspective view of a stay.
Figure 10:
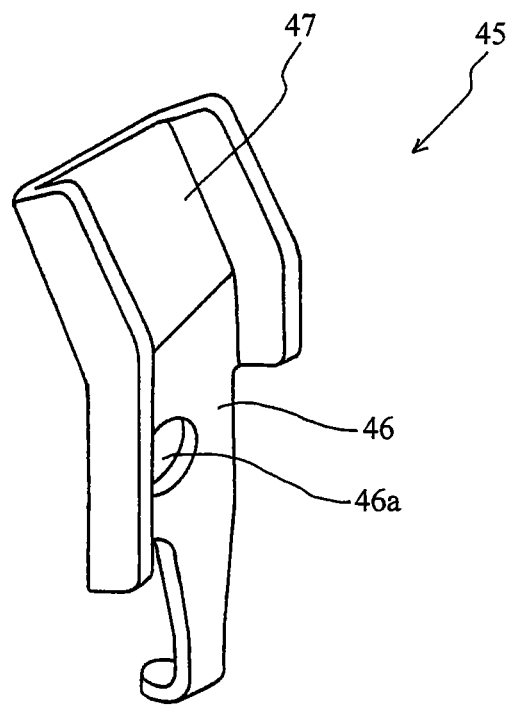
FIG. 10 is a perspective view of a belt regulating member.

The apparatus 30 for mounting the belt according to the present invention comprises a guide member 31 shown in FIGS. 4 to 8, a stay (fixing member) 41 shown in FIG. 9, and a belt regulating member 45 shown in FIG. 10.

Figure 4:
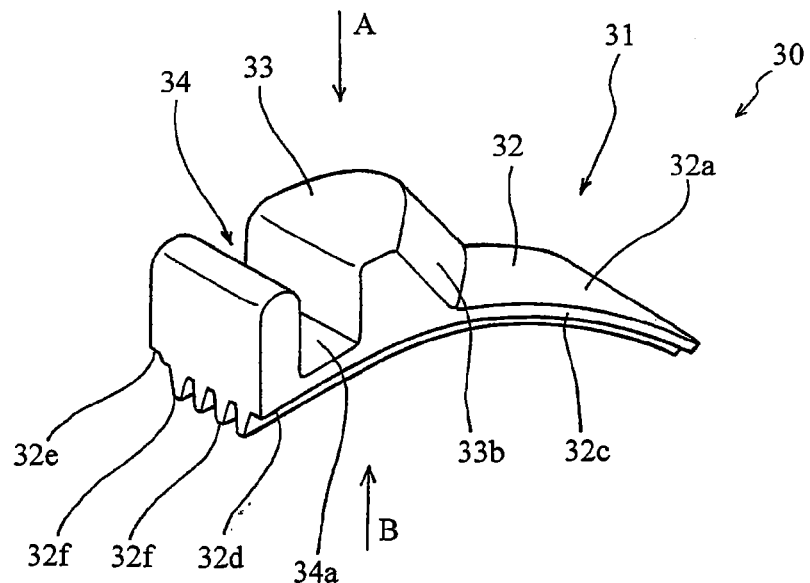
FIG. 4 is a perspective view of the guide member.
Figure 5:
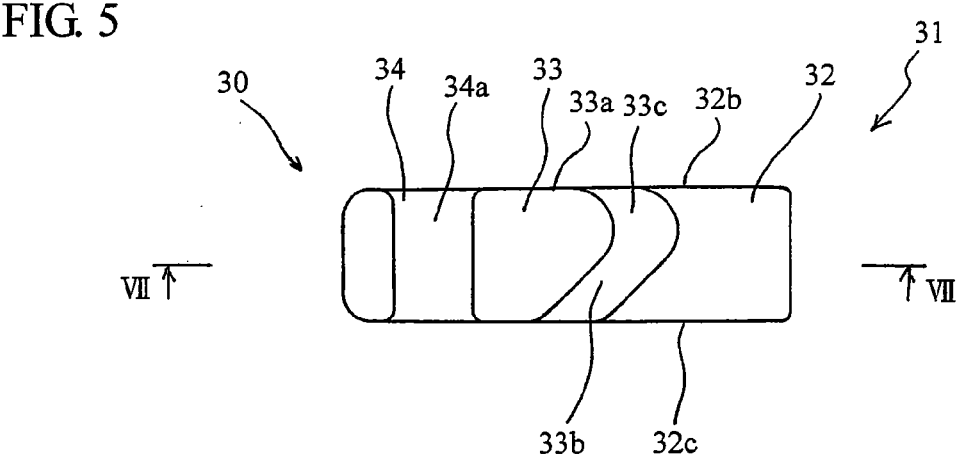
FIG. 5 is a top view of the guide member shown in FIG. 4 when viewed in the direction of an arrow A therein.
Figure 6:
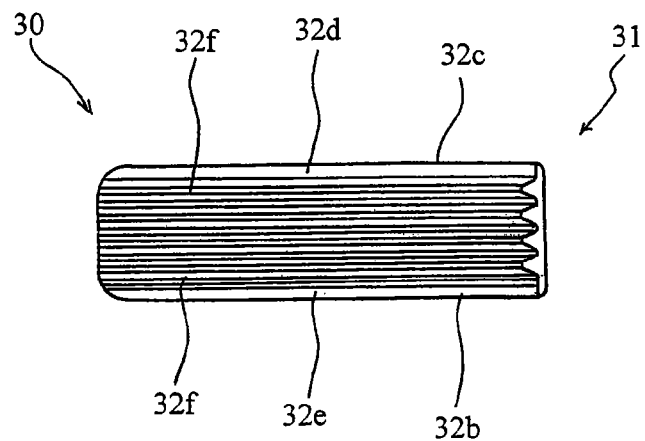
FIG. 6 is a bottom view of the guide member shown in FIG. 4 when viewed in the direction of an arrow B therein.

FIG. 4 is a perspective view of the guide member 4; FIG. 5 is a top view of the guide member 4 when viewed in the direction of an arrow A shown in FIG. 4; FIG. 6 is a bottom view of the guide member 4 when viewed in the direction of an arrow B shown in FIG. 4; FIG. 7 is a cross-section of the guide member 4 which is obtained by cutting the guide member along line VII-VII in FIG. 5; and FIG. 8 is a cross-section of the guide member 4 which is obtained by cutting the guide member along line VIII-VIII in FIG. 7.

The guide member 31 is made of a plastic material, and comprises an attaching element 32, a belt guiding element 33, and an engaging element 34 which are integral with each other. The attaching element 32 has an arc form in the cross-section with extending in the rotational direction of the pulley 11. Accordingly, the inner surface of the attaching element 32 is fit with the outer pulley groove 16 of the pulley 11. The inner surface of the attaching element 32 has a contour for covering the outer periphery 13a of the outer pulley flange 13 and the outer periphery 15a of middle pulley flange 15. The belt guiding element 33 is protruded from an outer surface 32a of the attaching element 32, at the middle thereof with respect to the longitudinal direction of the attaching element 32. The engaging element 34 has a concave shape (channel shape) having a flat bottom 34a. The engaging element 34 is configured to be provided on a rear side of the belt guiding element 33, with respect to the rotational direction of the pulley 11. A belt retainer 44 of the stay 41, which will be discussed later, is fit with the engaging element 34.

The attaching element 32 has an outer surface 32a having edges extending to inner and outer lateral sides 32b and 32c thereof, with respect to the axial direction of the pulley 11. The inner and outer lateral sides 32b and 32c extend from the outer surface 32a in a smooth configuration without irregularity or a sharp edge. On the other hand, the inner surface of the attaching element 32 has an outer edge 32d and inner edge 32e which are configured to be seated on the outer periphery 13a of the outer pulley flange 13 and the outer periphery 15a of the middle pulley flange 15. Between the outer edge 32c and the inner edge 32e, a plurality of V-ribs 32f is provided so as to be seated in the outer pulley groove 16 and the V-grooves 16a.

The belt guiding element 33 comprises an inner lateral side 33a which is flush with the inner lateral side 32b of the attaching element 32. The belt guiding element 33 also has a belt introduction surface 33b extending from the inner lateral side 33a. The belt introduction surface 33b is configured to face a front side with respect to the rotational direction of the pulley 11. The belt guide element 33 has a semi-curved shape when viewed in the direction of the arrow A, as shown in FIG. 5. Moreover, it is possible that the belt guide element 33 is configured to have the front end of the outer lateral side with respect to the rotational direction of the pulley 11, comparing to the front end of the inner lateral side 33a (FIG. 5). The belt introduction surface 33b downwardly extends from the semi-curved top surface of the belt guide element 33 to the outer surface 32a of the attaching element 32. Furthermore, a transition part 33c from the inner surface 33a to the belt introduction surface 33b has a smooth contour without irregularity or a sharp edge. The guide member 31 is easily and cheaply manufactured from a plastic material, and protects the crank pulley 11 and the V-ribbed belt 5 from damages.

FIG. 9 is a perspective view of the stay 41. The stay 41 has a simple configuration which is approximately in a U shape comprising a securer 43 and a belt retainer 44 which are connected by the connection 42 provided therebetween. For the installation, the securer 43 of the stay 41 is inserted into one of the service holes 12 perforated in the crank pulley 11, and the belt retainer 44 is fit on the engaging element 34 of the guide member 31 so that the guide member 31 is fit in the outer pulley groove 16 of the crank pulley 11. Moreover, the belt retainer 44 is configured to extend across the guide member 31 so that the belt retainer 44 is seated in the engaging element 34. The retainer 44 extends from an outer lateral side 32c to the inner lateral side 32b of the guide member 31, and further extends exceeding the inner lateral side 32b thereof. A free end 44a of the belt retainer 44 is configured to secure the belt 5. Accordingly, the belt 5 is seated in the inner pulley groove 17.

FIG. 10 is a perspective view of a belt regulating member 45. The belt regulating member 45 comprises a basal part 46 having a bolt hole 46a therein and a belt leading portion 47 extending from the basal part 46. The basal part 46 is configured to be attached to the bracket 4 protruded from the engine main body 2 by a bolt 48. The belt leading portion 47, when attached on the bracket, serves to maintain the belt 5 seated in the inner pulley 27 the air-conditioner pulley 21, without detaching therefrom. The guidance of the belt is attained because the belt regulating member is brought into slide contact with the outer side of the belt with respect to the axial direction of the pulley 27. The belt leading portion 47 gradually transits to the lateral sides thereof without having irregularity or a sharp edge.

The process for mounting the V-ribbed belt 5 on the crank pulley 11 and the air-conditioner pulley 22 by using the belt mounting apparatus 30 will be explained by referring to FIGS. 11 to 15. For simplifying the figures, the engine main body 1 is not drawn in FIGS. 11 to 15.

Figure 11:
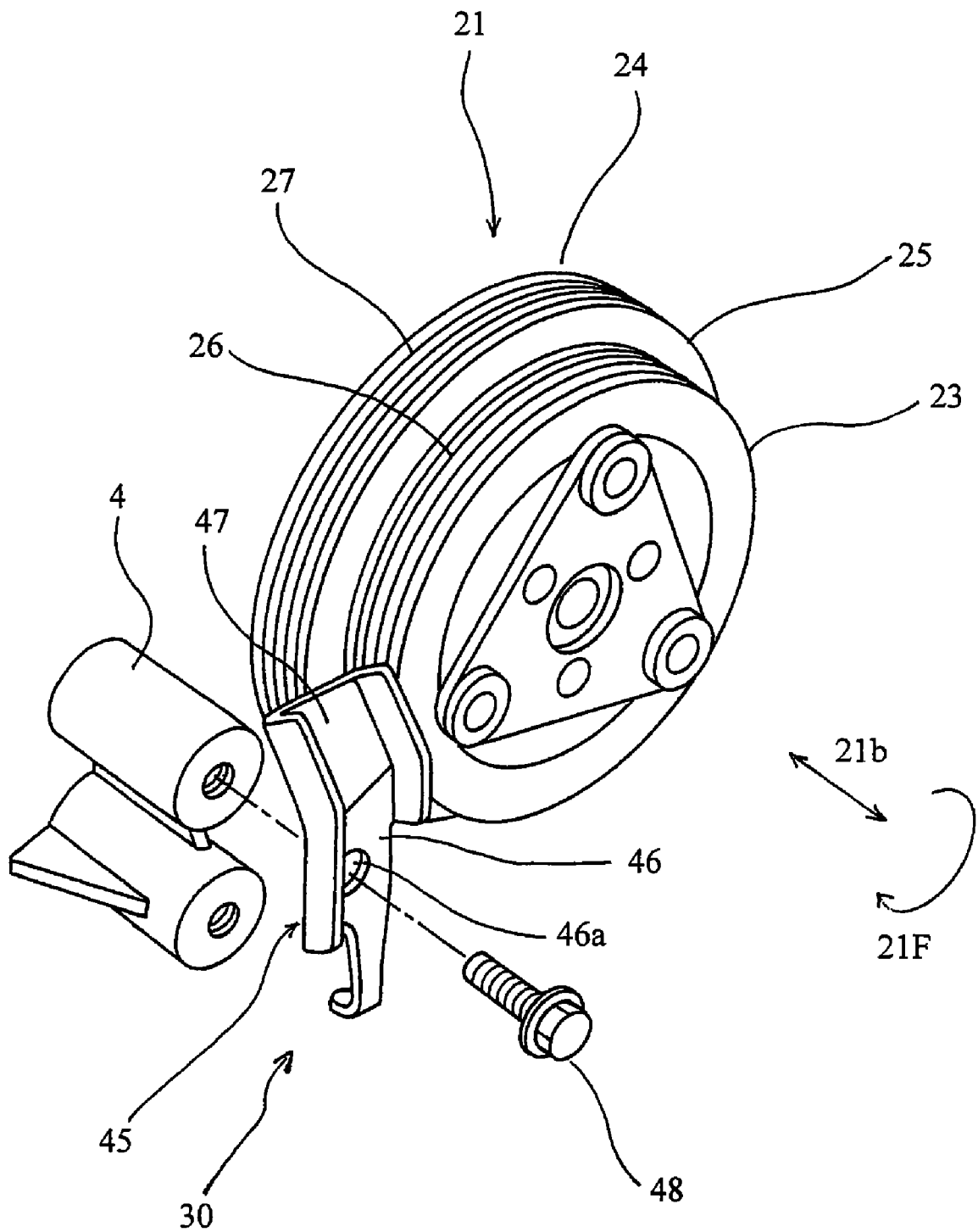
FIG. 11 is a diagram for explaining an operation for installing a belt regulating member on an air-conditioner pulley.

FIG. 11 is a diagram for explaining an operation for installing a belt regulating member 45 on the air-conditioner pulley 21. In FIG. 11, the belt regulating member 45 is provided on the bracket 4 in the engine main body 2 with the belt leading portion 47 being maintained in an upper side. In this state, the bolt 48 is inserted to the bolt hole 46a in the basal part 46, and screwed into the bolt hole 4a of the bracket 4. Thus, the belt regulating member 45 is fixed to the bracket 4.

Figure 12:
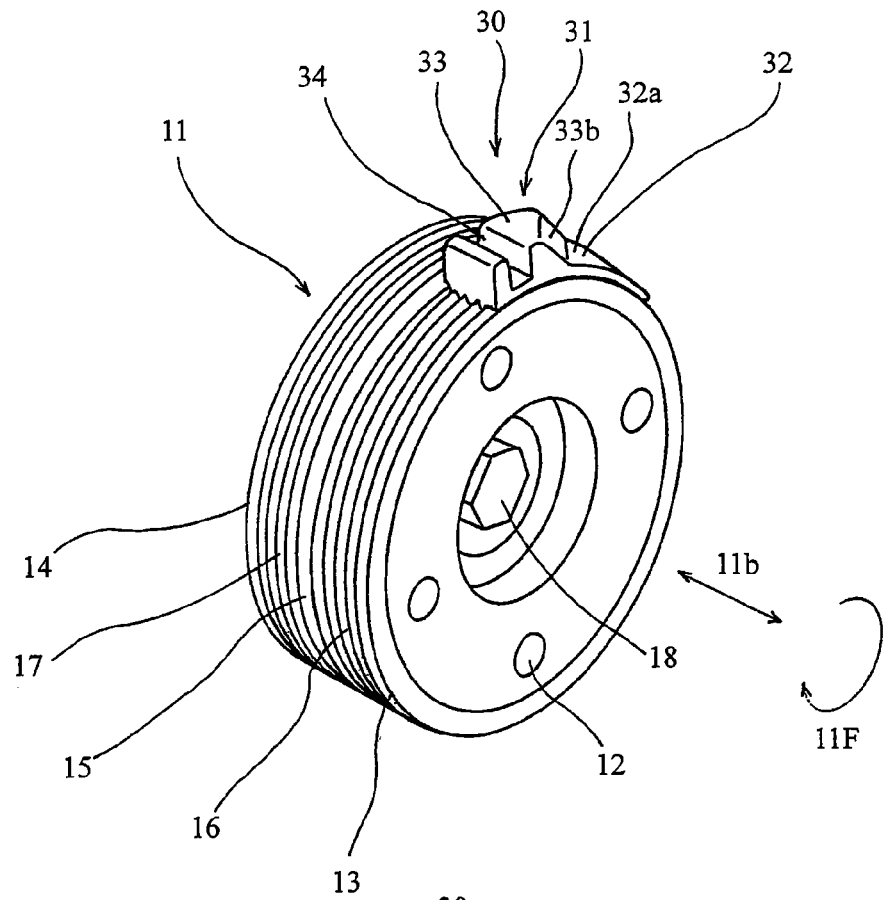
FIG. 12 is a diagram for explaining an operation for installing a guide member on a crank pulley.

FIG. 12 is a diagram for explaining an operation for installing the guide member 31 on the crank pulley 11. The attaching element 32 is provided on the crank pulley 11 so that the inner surface of the attaching element 32 is seated in the outer pulley groove 16 of the crank pulley 11, and the outer edge 32d and inner edge 32e of the attaching element 32 covers the outer periphery 13a of the outer pulley flange 13 and the outer periphery 16a of the middle pulley flange 15. Moreover, the V-ribs 32f are seated in the V grooves 16a in the pulley grooves 16. Accordingly, the guide member 31 is prevented from moving in an axial direction of the crank pulley 11.

Figure 13:
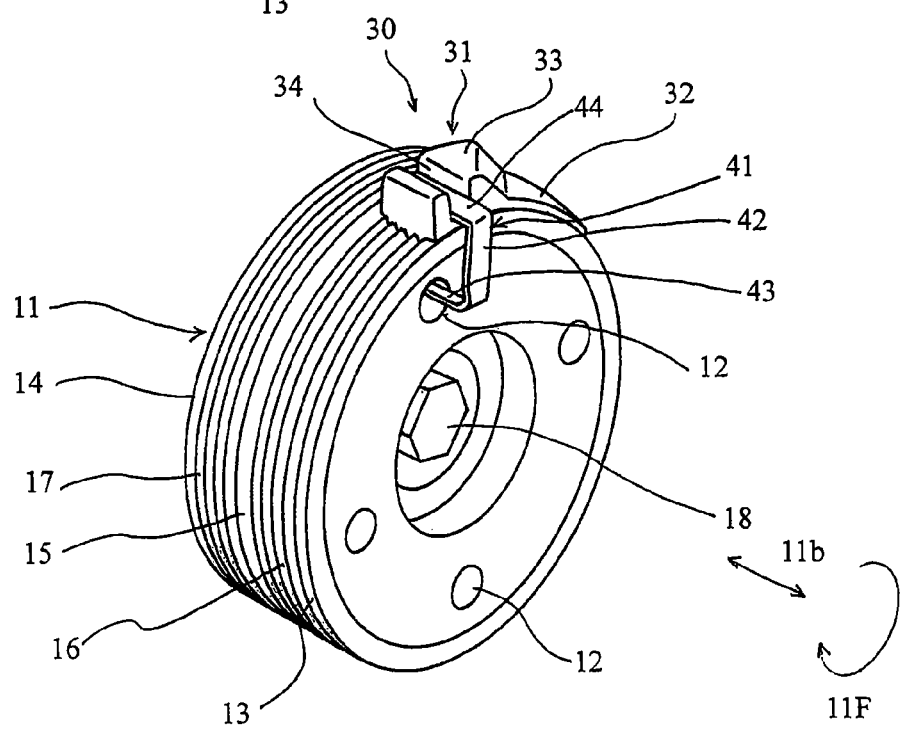
FIG. 13 is a diagram for explaining an operation for fixing a guide member by the stay.

FIG. 13 is a diagram for explaining an operation for fixing the guide member by the stay 4. After the guide member 31 is set on the crank pulley 11, the securer 43 of the stay 41 is inserted into the service hole 12 in the crank pulley 11. Furthermore, the belt retainer 44 is fit with the engaging element 34 of the guide member 31 so that the guide member 31 is fixed on the crank pulley 11 (fixed state). In the fixed state, the free end 44a of the belt retainer 44 does not exceed inner lateral side 33a of the belt guiding element 33. Namely, the free end 44a does not extend across the engaging element 34. Thereafter, the crank pulley 11 is rotated so as to have the guide member 31 in the direction of the air-conditioner pulley 24.

Figure 14:
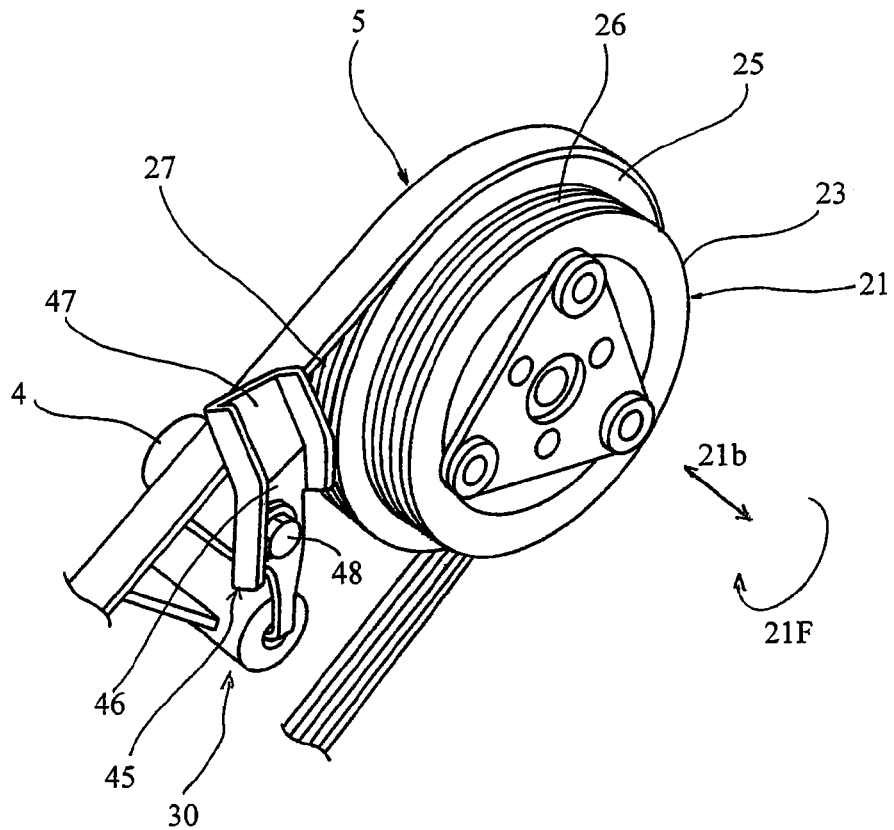
FIG. 14 is a diagram for explaining an operation for seating the V-ribbed belt on the air-conditioner pulley.

FIG. 14 is a diagram for explaining an operation for seating the V-ribbed belt 5 on the air-conditioner pulley 21. As shown in the figure, the belt 5 is positioned in the inner pulley groove 17 from the outer side of the outer pulley flange 23 with respect to the axial direction of the air-conditioner pulley 21. Moreover, the belt 5 is provided on an inner side of the belt leading portion 47 of the belt regulating member 45, with respect to the axial direction of the air-conditioner pulley 21. Thus, the V-ribbed belt 5 is seated in the inner groove 27, and the V-ribs 7 are seated in the V-grooves 27 in the inner groove 27.

Figure 15:
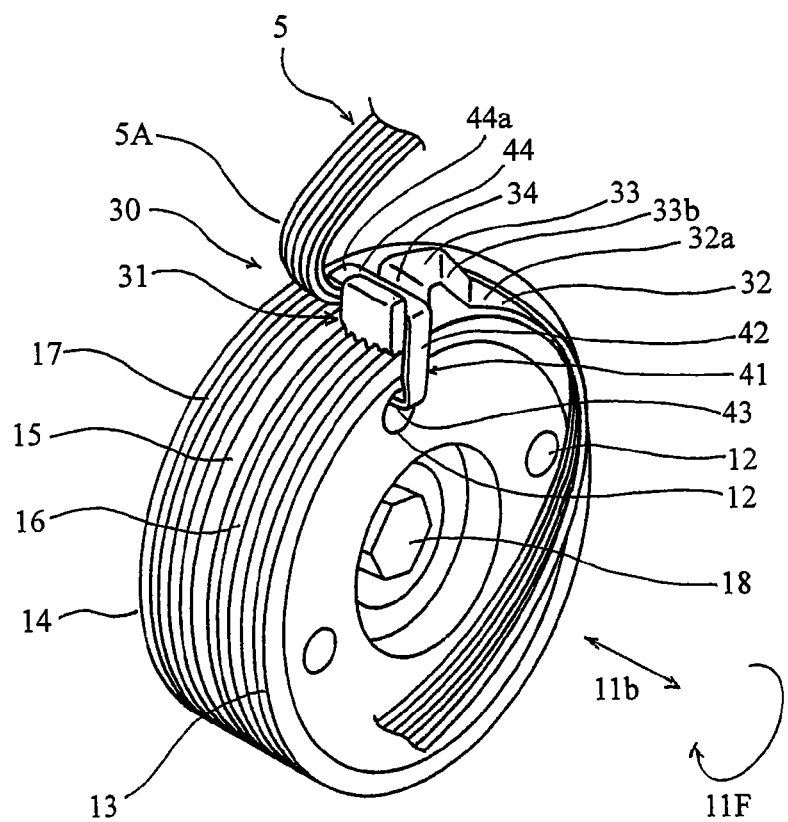
FIG. 15 is a diagram for explaining an operation for seating the belt on the crank pulley.

FIG. 15 is a diagram for explaining an operation for seating the belt 5 on the crank pulley 11. After the belt 5 is positioned in the inner pulley groove 15 of the air-conditioner pulley 21, the belt 5 is folded at a folding point 5A, in a reversed direction with respect to the rotational direction of the pulleys. Then, the folding point 5A is seated in the inner pulley groove 17 of the crank pulley 11. The belt 5 at the folding point 5A is seated in the inner pulley groove 16 of the crank pulley 11. Namely, the V ribs 7 formed on the belt 5 are fit with the V-grooves in the inner pulley groove 17. Moreover, the securer 43 of the stay 41 is inserted in one of the service holes 12 in the crank pulley 11, and the belt retainer 44 is inserted into the engaging element 34 of the guide member 31. In this state, the belt retainer 44 extends across the guide member 31 and exceeds the inner lateral side of the engaging element 34. The free end (protruded end) of the belt retainer 44 secures the belt 5 around the point 5A, with application of pressure to the belt against the inner pulley groove 17 of the crank pulley 11.

Further, the belt 5 extending from the part secured by the retainer 44 is turned in an outer direction of the crank pulley 11, with respect to the axial direction thereof. Then, the belt 5 is positioned to an outside of the pulley 11, by the guidance of the belt introduction surface 33b of the guide member 31. Therefore, the belt 5 extends across the middle pulley flange 15, the outer pulley groove 16, and the outer pulley flange 13. In other words, the belt 5 after being secured by the belt retainer 44 of the stay 41 is brought to extend in a frontward direction of the guiding element 33 with respect to the rotational direction of the pulley 11, and also in an outer direction of the crank pulley 11 with respect to the axial direction of the pulley 11. Since the tension is not applied to the belt 5 at this stage, it is easy to fold the belt 5 at the folding part 5A, to clamp the belt 5 by the belt retainer 44 and to lead the belt 5 along the guiding element 33.

Furthermore, the crank pulley 11 is rotated in the predetermined rotational direction, by attaching a tool such as a commercially available wrench to the crank pulley bolt 18 of the crank pulley 11. Following the rotation of the pulley 11, the guide member 31 moves in a rotational direction of the pulley 11. Accordingly, the range of the V-ribbed belt 5 seated in the inner pulley groove 17 is gradually increased.

As explained above, the V-ribbed belt 5, which is extending in a rearward direction of the guide member 31 with respect to the rotational direction of the pulley, is seated in the inner pulley groove 17. The belt regulating member 45 restricts the belt 5 at this portion from moving in the axial direction of the pulley. On the other hand, several kinds of force function on the belt 5 extending in a frontward direction of the guide member 31 with respect to the rotational direction of the pulley 11. The force includes a restoring force of the belt 5 which are deviated in an axial direction of the pulley 11, tension applied to the belt 5, and a force for moving the belt 5 toward the inner pulley groove 17 by the guidance of the belt introduction surface 33b.

In accordance with the rotation of the crank pulley 11, the belt 5 extending in front of the guide member 31 with respect to the rotational direction of the pulley 11, moves from the position close to the center of the crank pulley 11 gradually to the outer periphery of the outer pulley flange 13. Thereafter, the tension and the restoring force of the belt 5 cause the belt 5 to move across the outer pulley flange 13, outer pulley groove 16, and middle pulley flange 15. Therein, the belt 5 slides on the outer lateral side 32b and the outer surface 32a of the attaching element 32, and belt introduction surface 33b of the belt guiding element 33. Finally, the belt 5 is seated in the inner groove 17 of the crank pulley 11. Thus, the V-ribbed belt 5 is mounted on an inner pulley groove 17 of the crank pulley 11 and the inner pulley groove 27 of the air-conditioner pulley 21.

After completing the mounting operation of the belt 5 in the inner pulley grooves 17 and 27, the tool attached to the crank pulley bolt 18 is removed. Moreover, the securer 43 and the belt retainer 44 of the stay 41 are detached from the service hole 12 of the crank pulley 12 and the engaging element 34 of the guide member 31. Then, the guide member 31 is also detached from the crank pulley 11, and the belt regulating member 45, from the bracket.

Accordingly, the belt mounting apparatus 30 according to the present invention remarkably increases the operational efficiency for mounting the V-ribbed belt 5 on the inner pulley groove 17 of the crank pulley 11 and the inner pulley groove 27 of the air-conditioner pulley 22. For the mounting operation, it is necessary to rotate the crank pulley 11 only once.

In addition to the above, the guide member 31 included in the belt mounting apparatus 30 prevents the belt 5 from contacting or sliding on the outer peripheries 13a and 15a of the outer and middle pulley flanges 13 and 15, since the guide member 31 covers the outer peripheries 13a and 15a and the outer pulley groove 16 provided therebetween 16. In other words, the belt mounting apparatus 30 protects the belt 5 and the crank pulley 11 from damages.

Furthermore, the belt 5 is prevented from being damaged when mounted on the pulleys by using the apparatus 30 of the invention. This is because the attaching element 32 of the guide member 31 covers the outer peripheries 13a and 15a of the outer and middle pulley flanges 13 and 15; the attaching element 32 of the guide member 31 has a lateral surface 32b and outer surface 32a extending from each other without forming irregularity or a sharp edge therebetween; and the belt introduction surface 33b of the belt guiding element 33 smoothly extends to the inner lateral side 33a without forming irregularity or a sharp edge therebetween. Thus, the belt 5 can be easily seated on the inner pulley groove 27, with the minimum expansion of the belt 5, when the belt 5 is moved across the outer pulley flange 13, outer pulley groove 16 and the middle pulley flange 15 by using the apparatus 30.

In addition to the above, the guide member 31 of the present invention is prepared by a plastic material. Therefore, the guide member 31 does not scrape the outer periphery 13a or 15a of the outer and middle pulley flanges 13 and 15. The belt 5 is not brought into contact with the outer periphery 13a of the outer pulley flange 13, which is covered by the guide member 31. Accordingly, it is possible to protect the belt 5 from damages.

Furthermore, it is made easy to install the belt V on the pulleys when the belt mounting apparatus 30 of the invention is used. In the conventional process, it was necessary to provisionally seat the belt in the outer pulley groove, to grip the belt by a hand, and then to pull and twist the belt in an outer direction of the pulley with respect to the rotational direction thereof. In the conventional method, it was further necessary to grasp the belt with rotating the pulley, for transferring the belt from the outer pulley groove to the inner pulley groove. Namely, the belt mounting apparatus 30 and the method of the present invention remarkably decreased the burden of operators.

Moreover, the belt mounting apparatus 30 and the method of the present invention insured the safety, by remarkably decreasing possible accidents, for instance pinching a finger between the pulley and the belt.

Second Embodiment

A method for mounting and dismounting a belt to and from pulleys, and an apparatus for mounting and dismounting the belt will now be explained in detail by referring to FIGS. 1 to 3 and FIGS. 16 to 24. Members/elements or parts thereof in FIGS. 16 to 24, which are corresponding to the members/elements or parts explained in FIGS. 5 to 15 are shown with the same reference numerals, and the detailed explanation of these are omitted.

The crank pulley 11 in the second embodiment has the outer, inner and middle pulley flanges 13, 14 and 15 with an identical diameter; and the outer and the inner pulley grooves 16 and 17 respectively between the outer and middle pulley flanges 13 and 15, and the inner and middle pulley flanges 14 and 15. On the other hand, the air-conditioner pulley 21 has the inner and the middle pulley flanges 24 and 25 with the same diameter with the inner and middle pulley flanges 14 and 15 of the crank pulley 11. Furthermore, the outer pulley flange 23 has a smaller diameter, comparing to the inner and middle pulley flanges 24 and 25. Moreover, the outer pulley groove 26 provided between the outer and the middle pulley flanges 23 and 25 has a smaller diameter comparing to the inner pulley groove 27 provided between the inner and the middle pulley flanges 24 and 25.

An apparatus 50 for mounting and dismounting a belt of the present invention comprises a guide member 51, in addition to the stay 41 and the belt regulating member 45 which has been already explained.

Figure 16:
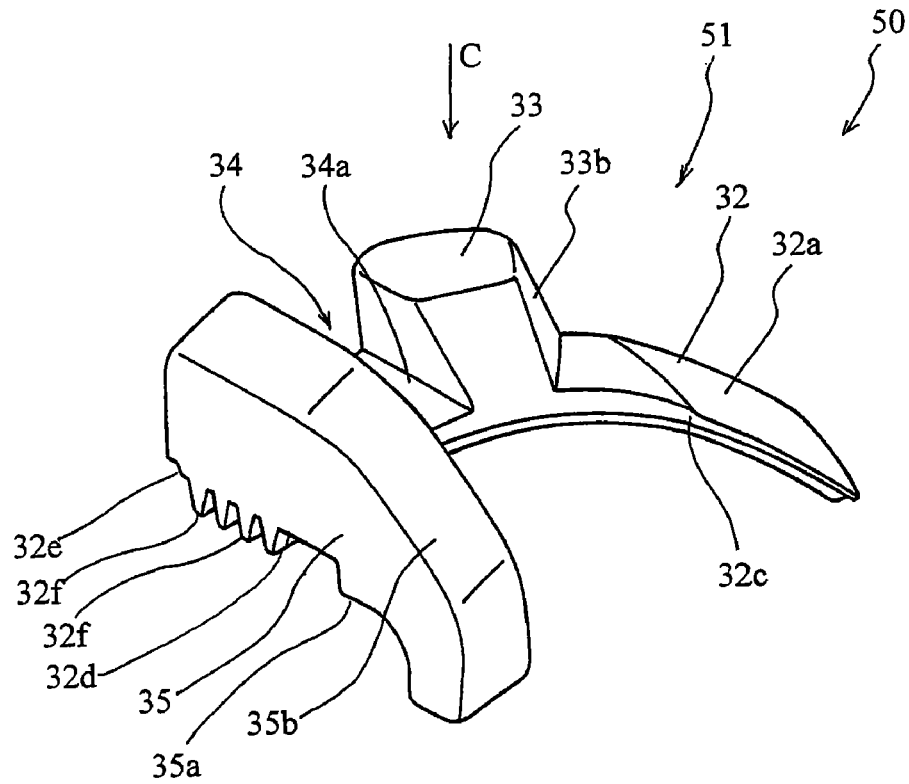
FIG. 16 is a perspective view of a guide member.
Figure 17:
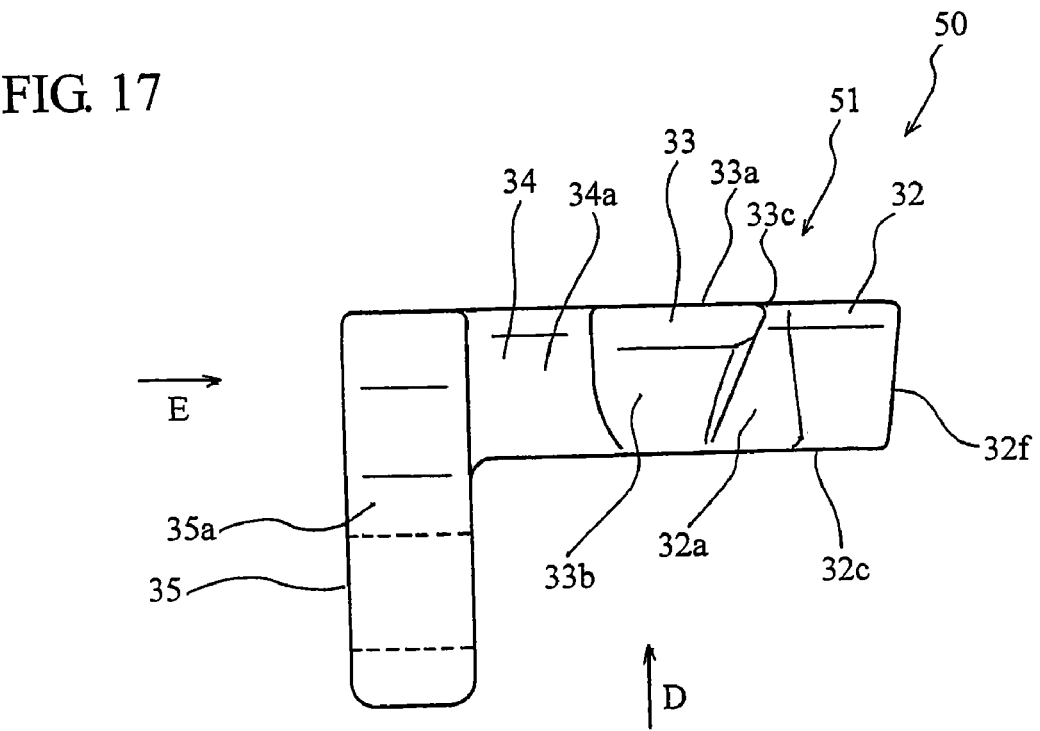
FIG. 17 is a top view of the guide member shown in FIG. 16 when viewed in a direction of an arrow C therein.
Figure 18:
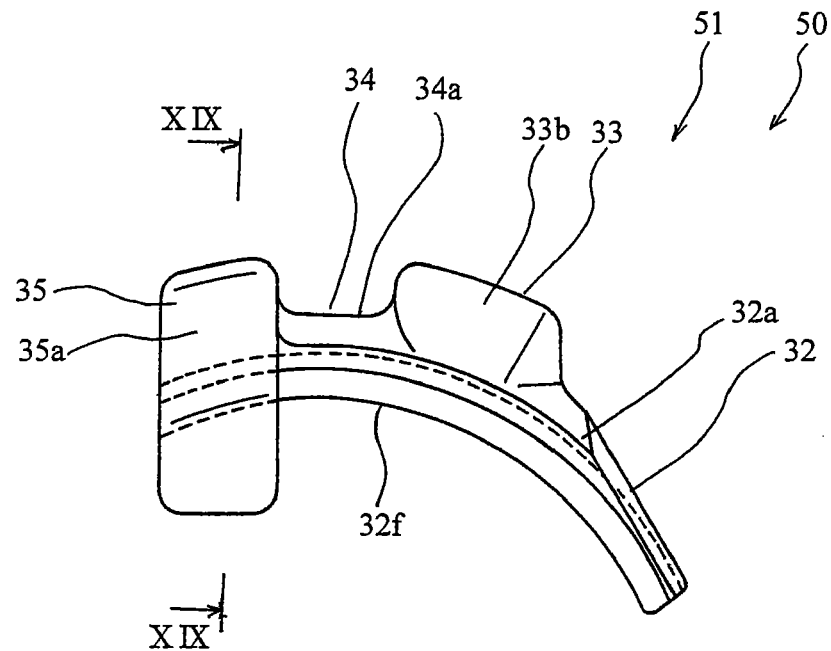
FIG. 18 is a side view of the guide member shown in FIG. 16 when viewed in a direction of an arrow D therein.
Figure 19:
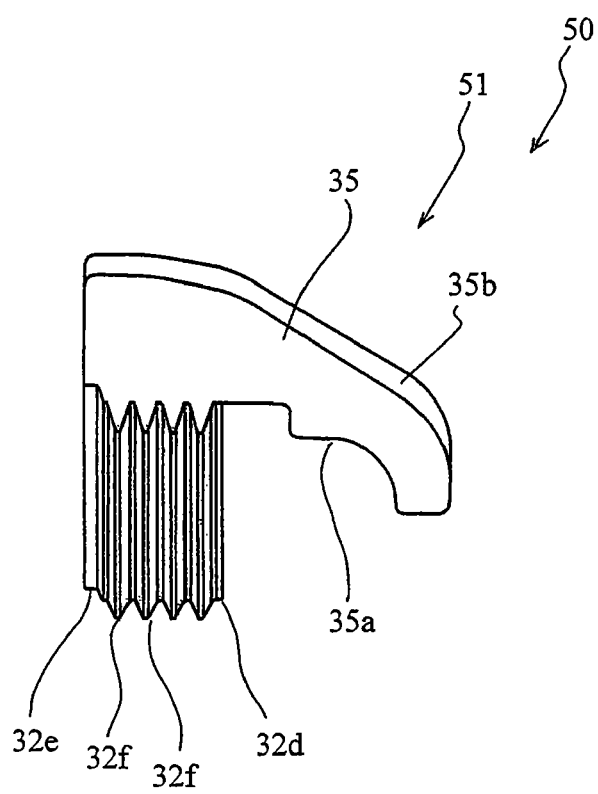
FIG. 19 is a side view of the guide member shown in FIG. 16 when in a direction of an arrow E therein.
Figure 20:
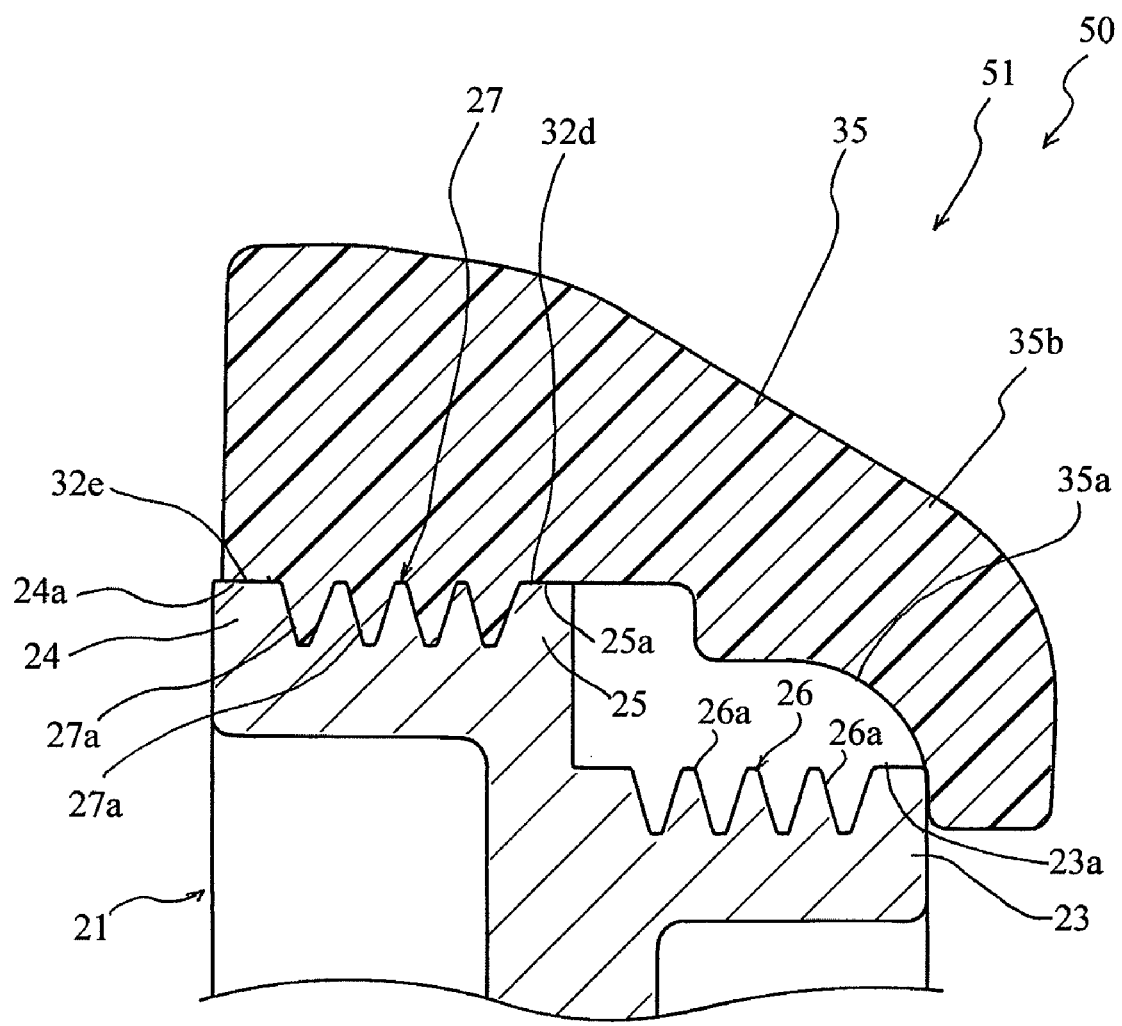
FIG. 20 is a cross-section of the guide member provided on the air-conditioner pulley, which is obtained by cutting the guide member along line XIX-XIX.
Figure 21:
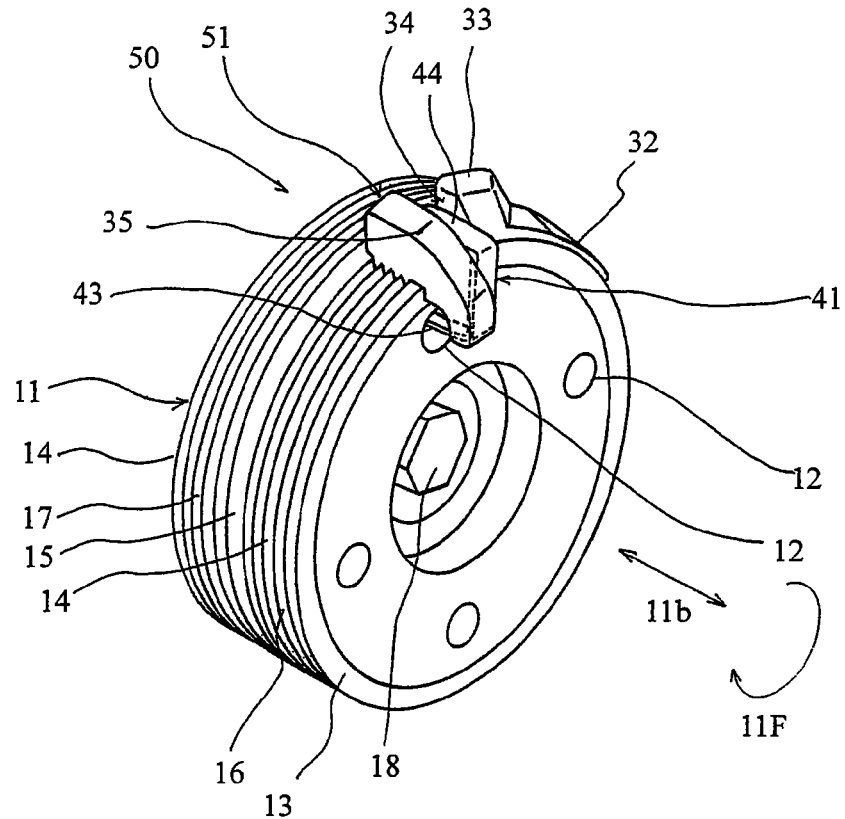
FIG. 21 is a diagram for explaining an operation for installing a guide member on a crank pulley.

The guide member 51 is explained in detail by referring to FIGS. 16 and 18. FIG. 16 is a perspective view of the guide member 51; FIG. 17 is a top view of the guide member 51 viewed in a direction of an arrow C shown in FIG. 16; FIG. 18 is a side view of the guide member 51 viewed in a direction of an arrow D shown in FIG. 17; FIG. 19 is a side view of the guide member 51 viewed in a direction of an arrow E shown in FIG. 17; and FIG. 20 is a cross-section of the guide member 51 provided on the air-conditioner pulley 21, obtained by cutting the guide member 51 along line XIX-XIX shown in FIG. 18.

The guide member 51 comprises an attaching element 32, a belt guiding element 33, an engaging element 34, and a belt deviation element 35, which are integral with each other. The attaching element 32 is configured to extend in a rotational direction of the crank pulley 11 so that the attaching member 32 is seated in the outer pulley groove 16. In other words, the attaching element 32 has a curved cross-section in the form of an arc so as to cover the outer peripheries 13a and 15a of the middle and outer pulley flanges 13 and 15. The belt guiding element 33 is protruded from the outer surface 32a of the pulley attaching element 32 so as to be provided at the middle of the attaching element 32 with respect to the longitudinal direction thereof. The engaging element 34 is configured to be provided at a rear part of the belt guiding element 33 with respect to the rotational direction of the pulley 11. Further, the belt deviation element 35 is configured to be protruded at the rear end of the attaching element 32 with respect to the rotational direction of the pulley 11.

The attaching element 32 has lateral ends smoothly extending to inner and outer lateral sides 32b and 32c thereof, with respect to the axial direction of the pulley 11, without having irregularity or a sharp edge. The attaching element 32 has an inner surface including an outer edge 32d and inner edge 32e. The outer and the inner edges 32d and 32e are respectively configured to be seated on the outer periphery 13a of the outer pulley flange 13 and the outer periphery 15a of the middle pulley flange 15. Moreover, the attaching element 32 has the V-ribs 32f between the outer and inner edges 32d and 32e. The V-ribs 32 are configured to be seated in the outer pulley groove 16 and the V grooves 16a formed therein. The inner surface of the attaching part 32 having V-ribs 32 and the outer and inner edges 32d and 32e is configured to be seated also in the outer periphery 25a of the middle pulley flange 25, outer periphery 24a of the inner pulley flange 24 and V grooves 27a in the inner pulley groove 27 of the air-conditioner pulley 21.

Similarly to the first embodiment, the belt guiding element 33 comprises an inner lateral side 33a which is flush with the inner lateral side 32b of the attaching element 32 and a belt introduction surface 33b extending from the inner lateral side 33a. The belt introduction surface 33a is configured to face a frontward direction with respect to the rotational direction of the pulley 11. The inner lateral side 32a extends to the belt introduction surface 33b without having irregularity or a sharp edge therebetween.

As shown in FIG. 20, the guide member 51 is provided on the air-conditioner pulley 21, wherein the outer edge 32d, inner edge 32e and V ribs 32f are seated on the outer and inner peripheries 25a and 24a and the V grooves 27a. The belt deviation element 35 is provided on the outer surface 32a of the attaching element 32 at the rear end thereof, and extends in an axial direction of the pulley 21. The belt deviation element 35 has a curved cross-section and an outer end of the element 35 downwardly inclines.

The belt deviation element 35 has an inner surface 35a extending toward the outer edge 32d of the attaching element 32, and is provided above the pulley groove 26 and the outer pulley flange 23. The inner surface 35a is configured to be spaced apart from both the outer groove 26 and the outer pulley flange 23. Moreover, the inner surface 35a is configured to have a shape with an off-set so as to approximately following the cross-sectional contour made by the pulley groove 26 and the outer periphery 23a, as shown in FIG. 20.

In addition to the above, the belt deviation element 35 has an outer surface 35b which functions as a belt guiding surface. The outer surface 35b is configured to gradually and downwardly incline toward the outer direction with respect to the axial direction of the pulley 21.

The guide member 51 for use in the present invention can be cheaply prepared from a plastic material, and is useful for protecting the crank pulley 11, air-conditioner pulley 21 and the V-ribbed belt 5 from being damaged.

The process for mounting the V-ribbed belt 5 on the belt on crank pulley 11 and the air-conditioner pulley 22 by using the belt mounting and dismounting apparatus 50 is substantially the same as explained as to the first embodiment. In the second embodiment, the belt deviation element 35 does not affect on the mounting operation 51. The guide member 51 except for the belt deviation element 35 has the same function as the guide member 31 explained in the first embodiment.

Before mounting the belt 5 on the pulleys, the belt regulating member 45 is provided on the bracket 4 of the engine main body 2. Then, the guide member 51 is seated on the crank pulley 11 so as to have the inner surface of the attaching element 32 contact the outer pulley groove 16 of the crank pulley 11. Thereafter, the stay 41 is provided on the guide member 51 so as to fix the guide member 51 on the crank pulley 11, as explained in connection with the first embodiment.

In the thus prepared state, the belt 5 is brought on the inner groove 17 of the air-conditioner pulley 21 from the outer side thereof so that the belt 5 is located on an inner side of the belt leading portion 47 of the belt regulating member 57, with respect to the axial direction of the pulley 21.

Figure 22:
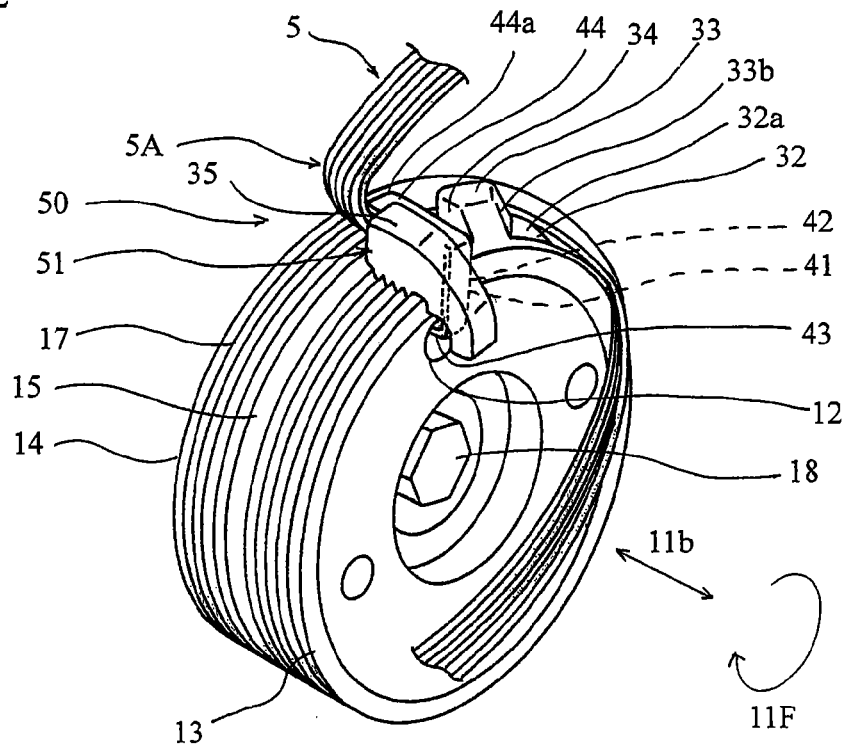
FIG. 22 is a diagram for explaining an operation for mounting a belt on a crank pulley.

FIG. 22 is a diagram for explaining an operation for mounting the belt 5 on the crank pulley 11. After the belt 5 is positioned in the inner pulley groove 27 of the air-conditioner pulley 21, the belt 5 is folded in a reversed direction with respect to the rotational direction of the pulleys, at a folding point 5A. Then, the folding point 5A is seated in the inner pulley groove 17 of the crank pulley 11. Moreover, the securer 43 of the stay 41 is inserted in one of the service holes 12 in the crank pulley 11, and the belt retainer 44 is inserted into the engaging element 34 of the guide member 31. In this state, the belt retainer 44 extends across the guide member 31 and exceeding the lateral side of the engaging element 35. The free end (protruded end) of the belt retainer 44 hold of the belt 5 around the folding point 5A with the application of pressure against the inner pulley groove 17 of the crank pulley 11.

Then, the belt 5 extending from the part fixed by the retainer 44 is turned in an outer direction of the crank pulley 11, with respect to the axial direction thereof. Namely, the belt 5 is lead to an outside of the pulley 11, by the guidance of the belt introduction surface 33b of the guide member 31. Therefore, the belt extend across the middle pulley flange 15, the outer pulley groove 16, and the outer pulley flange 13.

By rotating the crank pulley 11 in the predetermined rotational direction, the belt 5 is mounted on the inner pulley grooves 17 and 27 of the crank pulley and the air-conditioner pulley 11 and 21.

An operation for dismounting the belt 5 which has been seated in the inner pulley grooves 17 and 27, by using the guide member 51, will now be explained by referring to FIG. 23.

Figure 23:
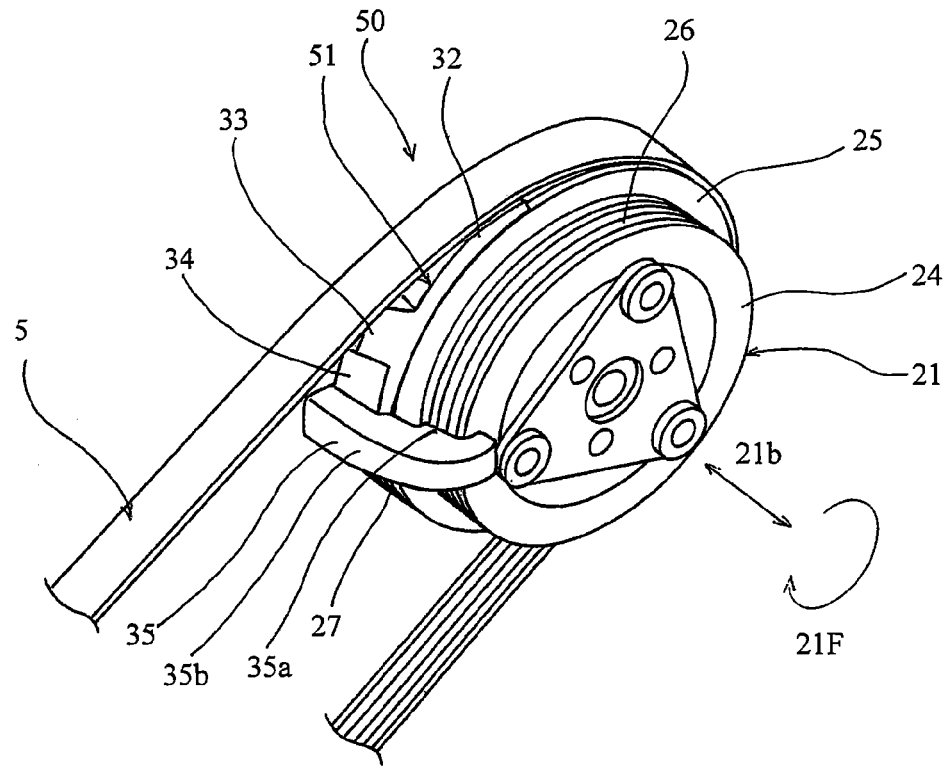
FIG. 23 is a diagram for explaining an operation for dismounting a belt from an air-conditioner pulley.

As shown in FIG. 23, the guide member 51 is provided on the air-conditioner pulley 21. For obtaining this situation, the attaching element 32 is seated in the outer pulley groove 27 of the air-conditioner pulley 21, which carries the belt 5 thereon, so that the inner surface of the attaching element 32 is in contact with the outer pulley groove 27. The guide member 51 has the outer and inner edges 32d and 32e of the attaching element 32 and the V-ribs 32a seated on the outer peripheries 25a and 24a of the middle pulley flange 25 and the inner pulley flange 24 and the V-grooves 27a formed in the inner pulley groove 27, respectively.

On the other hand, the belt deviation element 35 extends in the axial direction of the pulley 21. The deviation element 35 is provided above the pulley groove 26 and the outer pulley flange 23 so as to have the inner surface 35a spaced apart from the outer pulley groove 26 and the outer pulley flange 23. When the guide member 51 is positioned as shown in FIG. 23, the outer surface 35b (belt guiding surface) of the belt deviation element 35 downwardly inclines towards the outer side of the air-conditioner pulley 21.

With the above-described position of the guide member 51 maintained, the air-conditioner pulley 21 is rotated by about 90° in the rotational direction of the pulley 21 by using a tool such as a wrench, which has been attached to the crank bolt 18. Following the rotation of the pulley 21, the guide member 51 moves in a rotational direction of the pulley 21. Accordingly, the guide member 51 is maintained in a predetermined set position, with a frontal end 32f of the attaching element 32, with respect to the rotational direction of the pulley 21, is caught between the air-conditioner pulley 21 an the belt 5.

Figure 24:
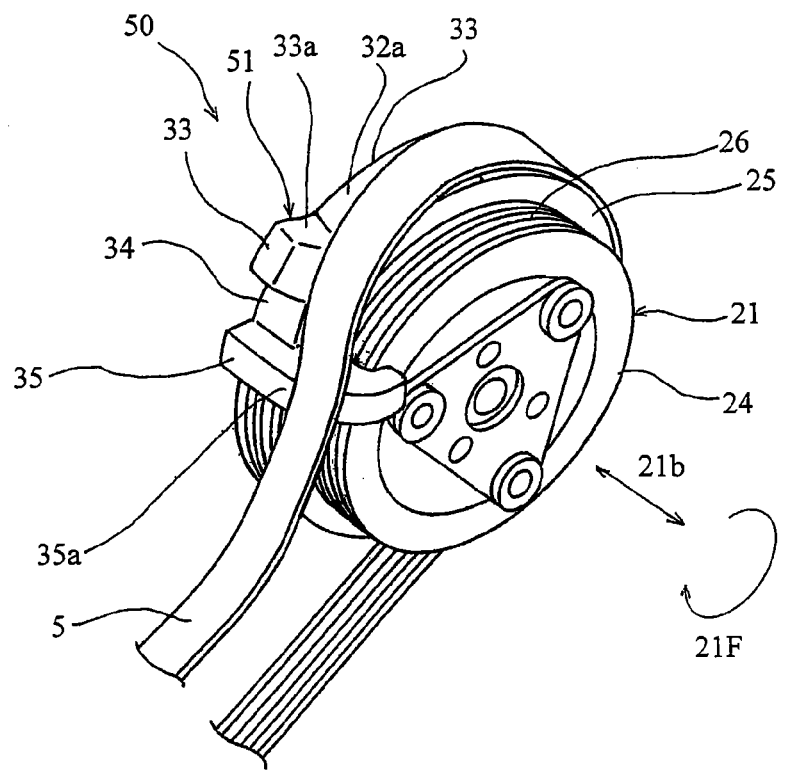
FIG. 24 is a diagram for explaining an operation for dismounting a belt from an air-conditioner pulley.
Figure 25:
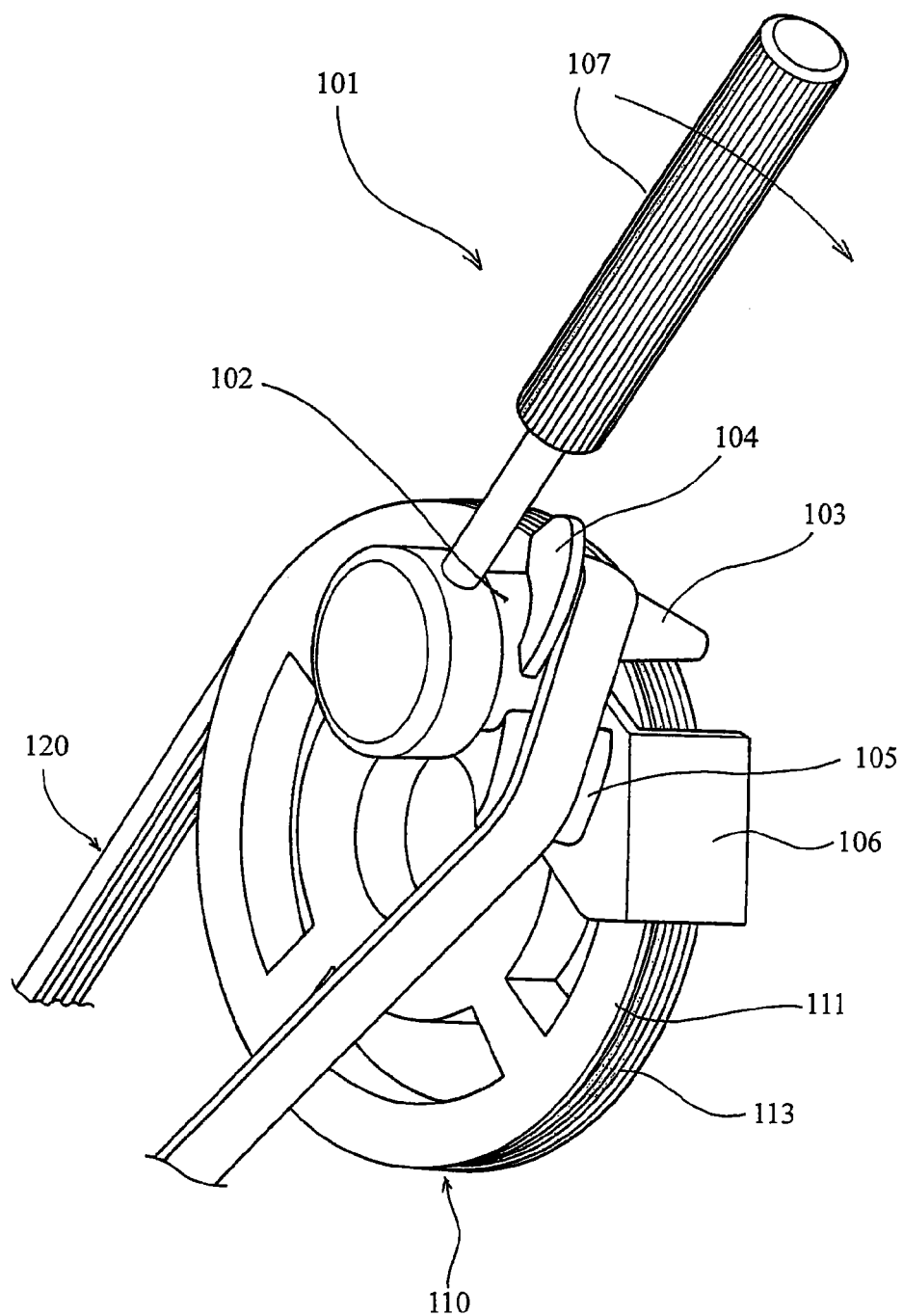
FIG. 25 is a diagram for showing an apparatus for mounting a belt around a pulley.

Thereafter, the crank pulley 11 is rotated in a rotational direction of the pulley 11. Consequently, the V-ribbed belt 5 is tripped by the attaching element 32 as shown in FIG. 24 so that the belt 5 is detached from the inner pulley groove 27. The detached belt 5 is brought in the outer direction of the air-conditioner pulley 21 with respect to the rotational direction thereof by the guidance of the belt introduction surface 33b.

In this way, the belt 5 is detached by an operator, from the inner groove 27 of the pulleys 21 to the outer side of the pulley 21 with respect to the axial direction thereof. In this operation, the detached belt 5 moves across the outer periphery 25a, pulley groove 26, and outer periphery 23b, by the guidance of the belt introduction surface 35b of the belt deviation element 35. As a result, the belt 5 is detached from both the crank pulley 11 and the air-conditioner pulley 21.

According to the second embodiment of the invention, it is possible to safely and efficiently mount the V-ribbed belt 5 on pulleys 11 and 21 by using the method and the apparatus including the guide member 51 and the stay 41. The guide member 51 and the stay 41 are useful also for protecting the crank pulley 11 and the belt 5 from damages.

It is easy to dismount the belt from the pulleys 11 and 21, by using the method or the apparatus of the present invention. As described in the second embodiment, the outer peripheries 23a and 25a and outer pulley groove 26 are covered by the belt deviation member 35 in the guide member 51. Therefore, the deviation member 35 protects the outer peripheries 23a and 25a and outer pulley groove 26 from being damaged, by eliminating the contact or slide contact by the belt 5.

By the provision of the belt guiding surface 33c and 35b of the belt guiding surface 33 and the belt deviation element, it is also possible to minimize the elongation of the belt 5. When the belt 5 is detached from the inner groove, and is brought to the outer part of the pulleys 11 and 21 with respect to the axial direction thereof, the belt deviation element 35 is helpful to smoothly guide the belt 5, and hence to prevent the belt 5 from damages.

In the above discussed first and second embodiment, the engaging element 34 has a concaved (channel) shape. Alternatively, it is possible to provide a perforation as the engaging element 34. It is also possible to prepare the stay 41 from a bar which is bent in the form of a letter U or C.

It is also possible, in the present invention, to mount and/or dismount the belt to and from pulleys other than the crank pulley and air-conditioner pulley.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A method for mounting a belt on a first pulley and a second pulley, the first pulley successively having an outer pulley flange, a middle pulley flange, and an inner pulley flange; an outer pulley groove provided between the outer pulley flange and the middle pulley flange, and an inner pulley groove provided between the middle pulley flange and the inner pulley flange, and the second pulley having a pulley groove, the belt having a ring-shape and configured to be stretched in a peripheral direction, the belt being mounted on the first pulley groove by being positioned thereon from the outer side of the outer flange, with respect to the axial direction of the first pulley, comprising:

using a guide member and a fixing member to install the belt in the inner pulley groove, wherein the guide member comprises an attaching element and a belt guiding element, the attaching element extending in the peripheral direction of the first pulley, the attaching element having an inner surface configured for being seated in the outer pulley groove of the first pulley and for covering the outer peripheries of the outer pulley flange and the middle pulley flange, the belt guiding element provided approximately at the center of the attaching element with respect to the longitudinal direction thereof and protruding from the attaching element, the guide member having a belt introduction surface configured to face the rotational direction of the first pulley when the guide member is installed on the first pulley, the fixing member configure to fix the guide member on the first pulley and to hold the belt so that the belt is seated in the inner pulley groove of the first pulley;

winding the belt around the pulley groove of the second pulley;

fitting the guide member in the inner groove of the first pulley;

fixing the guide member on the first pulley using the fixing member;

seating the belt in the inner pulley groove of the first pulley using the fixing member;

positioning the belt in the outer direction with respect to the axial direction of the first pulley, by the guidance of the belt introduction surface of the guide member; and rotating the first pulley in the rotational direction of the first pulley so as to seat the belt in the inner pulley groove of the first pulley.

2. An apparatus for mounting a belt on a first pulley and a second pulley, the apparatus comprising:

a guide member comprising:
  an attaching element having a top surface and a bottom surface having a concave curvature configured to mate with an outer pulley groove of the first pulley, and
  a belt guiding element protruding from the top surface of the attaching element and having a belt introduction surface configured to guide the belt towards an inner pulley groove of the first pulley;

a fixing member configured to couple the guide member to the first pulley comprising:
  a belt retainer having a first end and a second end,
  a securer having a first end and a second end, and
  a connector that connects the second end of the belt retainer with the second end of the securer,
  wherein the belt retainer extends in an axial direction of the first pulley across the guide member and the front end of the belt retainer extends beyond the guide member to engage the belt causing the belt to mate with the inner pulley groove of the first pulley, and
  wherein the first end of the securer is configured to secure the guide member to the first pulley.

3. The apparatus of claim 2, wherein the first end of the securer is configured to be inserted into a service hole perforated in the first pulley.

4. The apparatus of claim 2, wherein the attaching element has at least one V-shaped rib protruding from the bottom surface.

5. The apparatus of claim 2, further comprising a belt regulating member comprising a basal portion with a first end and a second end, an angled belt leading member protruding from the first end, and a hole disposed on the basal portion.

6. The apparatus of claim 5, wherein a channel is disposed across the width of the belt guiding element for engaging the belt retainer.

7. The apparatus of claim 2, wherein a channel is disposed across the width of the belt guiding element for engaging the belt retainer.

8. A method for mounting and dismounting a belt on a first pulley and a second pulley, each of the first pulley and the second pulley successively having an outer pulley flange, a middle pulley flange, and an inner pulley flange; an outer pulley groove provided between the outer pulley flange and the middle pulley flange, and an inner pulley groove provided between the middle pulley flange and the inner pulley flange, the belt having a ring-shape and configured to be stretched in a peripheral direction, the belt being mounted and dismounted to and from the inner pulley grooves of the first pulley and the second pulley by being positioned thereon from the outer side of the outer flanges, with respect to the axial direction of the first pulley and the second pulley, comprising:

using a guide member and a fixing member to mount and dismount the belt to and from the first and the second pulleys, wherein the guide member comprises an attaching element, a belt guiding element and a belt deviation element, the attaching element extending in the peripheral direction of the first pulley and the second pulley, the attaching element having an inner surface configured for being seated in the outer pulley groove of the first pulley and the inner pulley groove of the second pulley and for covering the outer peripheries of the middle pulley flange and the outer pulley flange of the first pulley and the outer peripheries of the inner pulley flange and the middle pulley flange of the second pulley; the belt guiding element provided approximately at the center of the attaching element with respect to the longitudinal direction thereof and protruding from the attaching element, the belt guiding element having a belt introduction surface configured to face the rotational direction of the first pulley and the second pulley; the belt deviation element configured to extend in an outer direction with respect to the axial direction of the second pulley so as to cover the outer pulley groove and the outer periphery of the outer pulley flange of the second pulley, the fixing member configure to fix the guide member on the first pulley and to hold the belt so that the belt is seated in the inner pulley groove of the first pulley;

winding the belt around the pulley groove of the second pulley;

fitting the guide member in the inner groove of the first pulley;

fixing the guide member on the first pulley using the fixing member; seating the belt in the inner pulley groove of the first pulley using the fixing member;

positioning the belt in the outer direction with respect to the axial direction of the first pulley, by the guidance of the belt introduction surface of the guide member;

rotating the first pulley in the rotational direction of the first pulley so as to seat the belt in the inner pulley groove of the first pulley, whereby the belt is mounted on the first pulley and the second pulley; and fitting the guide member in the inner groove of the second pulley; and rotating the first pulley in the rotational direction of the first pulley, whereby the belt is dismounted from the first pulley and the second pulley.

9. An apparatus for mounting and dismounting a belt on a first pulley and a second pulley, the apparatus comprising:
a guide member comprising:
an attaching element having a top surface and a bottom surface having a concave curvature configured to mate with an outer pulley groove of the first pulley,
a belt guiding element protruding from the top surface of the attaching element and having a belt introduction surface configured to guide the belt towards an inner pulley groove of the first pulley, and
a belt deviating element protruding orthogonally from the belt guiding element;
a fixing member that, during the mounting of the belt, couples the guide member to the first pulley comprising:
a belt retainer having a first end and a second end,
a securer having a first end and a second end, and
a connector that connects the second end of the belt retainer with the second end of the securer,
wherein, during the mounting of the belt, the belt retainer extends in an axial direction of the first pulley across the guide member and the first end of the belt retainer extends beyond the guide member to engage the belt causing the belt to mate with the inner pulley groove of the first pulley,
wherein the first end of the securer is configured to secure the guide member to the first pulley during mounting of the belt, and
wherein, during dismounting of the belt, the bottom surface of the attaching element mates with an inner pulley groove of the second pulley, and the belt deviating element extends across an inner pulley groove of the second pulley to guide the belt off of the second pulley.

10. The apparatus of claim 9, wherein the first end of the securer is configured to be inserted into a service hole perforated in the first pulley during mounting of the belt.

11. The apparatus of claim 9, wherein the attaching element has at least one V-shaped rib protruding from the bottom surface.

12. The apparatus of claim 9, further comprising a belt regulating member having a basal portion having a first end and a second end, an angled belt leading member protruding from the first end, and a hole disposed on the basal portion.

13. The apparatus of claim 12, wherein a channel is disposed across the width of the belt guiding element for engaging the belt retainer of the fixing member.

14. The apparatus of claim 9, wherein a channel is disposed across the width of the belt guiding element for engaging the belt retainer of the fixing member.

* * * * *